United States Patent [19]
Ikegawa et al.

[11] Patent Number: 6,060,124
[45] Date of Patent: *May 9, 2000

[54] PROCESS AND APPARATUS FOR PRODUCING PREPREG

[75] Inventors: Naoto Ikegawa; Hiroshi Harada, both of Hirakata; Ryuichi Hamabe, Kadoma, all of Japan

[73] Assignee: Matsushita Electric Works, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,940

[22] Filed: Aug. 6, 1997

[51] Int. Cl.⁷ ....................................................... B05D 3/02
[52] U.S. Cl. ............................ 427/379; 118/68; 118/665; 118/695; 118/708; 118/712; 427/381; 427/384; 427/386; 427/389.8; 427/389.9; 427/394
[58] Field of Search ...................................... 427/379, 381, 427/384, 386, 389.8, 389.9, 394; 118/665, 695, 708, 712, 68

[56] References Cited

U.S. PATENT DOCUMENTS

| | | |
|---|---|---|
| 5,330,595 | 7/1994 | Held . |
| 5,633,042 | 5/1997 | Nakamura et al. . |

FOREIGN PATENT DOCUMENTS

| | | |
|---|---|---|
| 0476752 | 3/1952 | European Pat. Off. . |
| 5200748 | 8/1993 | Japan . |
| 91/19754 | 12/1991 | WIPO . |
| 95/17999 | 7/1995 | WIPO . |

OTHER PUBLICATIONS

Extract from "Printed Circuits Handbook", C.F. Coombs, 3rd ed. 1988, pp. 6.3–6.5.

Extract from "Encyclopedia of Chemical Technology", 3rd ed., 1979, pp. 386–426.

Extract from "Ullmanns Enzyklopadie der technishen Chemie:, 4th ed., Verlag Chemie, Weinheim–New York 1997, pp. 244–247, accompanied by English Translation.

*Primary Examiner*—Jeff H. Aftergut
*Attorney, Agent, or Firm*—Greenblum & Bernstein, P.L.C.

[57] ABSTRACT

There is provided a process of producing a prepreg in which a sheet-shaped fabric material as a reinforcing substrate is continuously provided, a thermosetting resin as a matrix resin in a molten state is supplied to the substrate, and the resin is heated, which process contains the steps of:

(a) a first coating step in which the matrix resin is applied to one surface of the reinforcing substrate using a first die coater, and an amount of the matrix resin to be applied is equal to or larger than an amount of the matrix resin which the reinforcing substrate is able to contain in its total void as much as possible, (b) a first heating step in which the reinforcing substrate having the matrix resin is heated by a first non-contact type heating unit so that the matrix resin is impregnated into the inside of the reinforcing substrate, whereby a laminar composite made of the matrix resin and the reinforcing substrate is obtained, (c) a second coating step in which the matrix resin is further applied to at least one of surfaces of the laminar composite using a second die coater, and (d) a second heating step in which the laminar composite which has an amount of the matrix resin applied in the step (c) is heated by a second non-contact type heating unit so as to semi-harden the matrix resin.

24 Claims, 24 Drawing Sheets

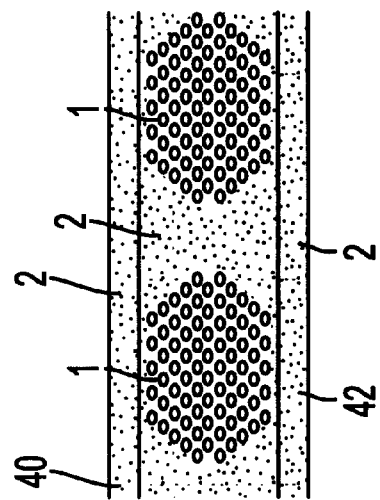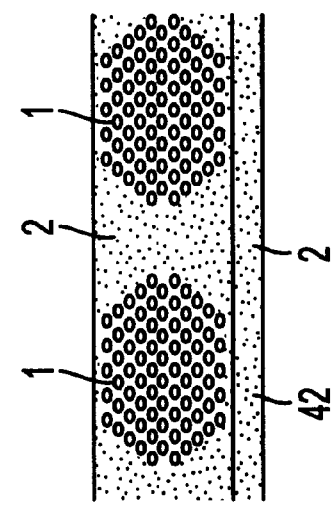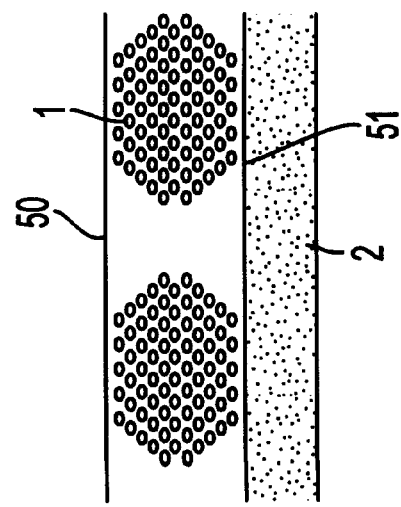

PROCESS AND APPARATUS FOR PRODUCING PREPREG

BACKGROUND OF THE INVENTION

1. Field of the Invention

The present invention relates to a process for producing a prepreg in which a thermosetting resin in a liquid state is supplied as a matrix resin to a sheet-shaped reinforcing substrate which comprises a fabric, and the substrate including the resin is heated, and also to an apparatus for producing the prepreg by such a process. Particularly, the present invention relates to a process for producing a prepreg in which a sheet-shaped reinforcing fabric substrate such as a glass cloth is impregnated with a matrix resin without using any solvent, and also to an apparatus for producing the prepreg by such a process.

2. Description of the Prior Art

For the production of a prepreg, a process has been known in which a thermosetting resin as a matrix resin is dissolved into a solvent so as to have a low viscosity solution, a reinforcing substrate such as a glass cloth is impregnated with the solution, and the impregnated substrate is dried. Using such a process, since the matrix resin sufficiently penetrates into the reinforcing substrate by means of the capillarity, the prepreg can be produced relatively easily.

In the above process in which the solvent is used, there are the following problems: solvent recovery facilities are necessary, and explosion preventive facilities are necessary, which increase the installation cost for the production of the prepreg; and a trace amount of residual solvent in the prepreg results in the quality deterioration of the produced prepreg because of the formation of bubbles.

In order to overcome the problems relating to the process in which the solvent is used, Japanese Patent Kokai Publication (JP-A) No. 5-200748 discloses a process for producing a prepreg using an apparatus as shown in FIG. 27. In the process, a double belt press 21 is provided, and a feeding unit 22 for a reinforcing substrate 1 such as a glass cloth and an extruder 23 are disposed in front of an inlet of the double belt press 21. In the extruder 23, a matrix resin 2 such as an epoxy resin is melted and extruded in a film form onto the reinforcing substrate so as to coat the substrate with the resin. The laminar composite of the reinforcing substrate and the resin matrix is introduced into the double belt press 21 and heated while applied with a plane pressure (i.e. a pressure applied by a plane(s)). During this stage, the matrix resin melts and penetrates into the inside of the reinforcing substrate when the composite is passed through the double belt press, so that the prepreg is produced containing the matrix resin in a semi-hardened state.

However, even when the above process using such an apparatus as shown in FIG. 27 is employed, there are still problems as follows:

When using the double belt press, the plane pressure is applied to the composite onto the both sides thereof so as to impregnate the reinforcing substrate with the matrix resin, so that bubbles do not easily get out of the inside of the composite and the bubbles are likely to be left, whereby voids are formed in the prepreg. Particularly, when the substrate has a larger woven mesh (or "metsuke") so that impregnability of the resin into the substrate is insufficient, the voids are more likely to be left. In addition, since the plane pressure are applied onto the both sides of the composite, the matrix resin on the reinforcing substrate is likely to be spread toward both edge portions of the composite so that an adjustable range of a content of the matrix resin which the substrate includes therein and thereon is narrow and it is difficult to produce a prepreg having a larger matrix resin content Further, an amount of the matrix resin in one side portion of the prepreg may be different from that in the other side portion, and surface smoothness of the prepreg may be insufficient.

BRIEF SUMMARY OF THE INVENTION

Thus, it is an object of the present invention to provide a process which overcomes the above problems and which produces a prepreg in which a matrix resin is sufficiently impregnated and remaining voids are few and of which surface smoothness and uniformity of impregnated resin content are improved. It is another object to provide a process for producing a prepreg which can increase an impregnated resin content of the prepreg. It is also an object of the present invention to provide an apparatus which carries out the process for producing such a prepreg.

The present invention provides a process of producing a prepreg in which a sheet-shaped fabric material (for example one comprising fibers, yarns of fibers, or bundles of yarns) as a reinforcing substrate is continuously provided, a thermosetting resin as a matrix resin in a molten state is supplied to the substrate and the resin is heated, which process comprises the steps of:

(a) a first coating step in which the matrix resin is applied to one surface of the reinforcing substrate using a first die coater, and an amount of the matrix resin to be applied is equal to or larger than an amount of the matrix resin which the reinforcing substrate is able to contain in its total void as much as possible, (b) a first heating step in which the reinforcing substrate having the matrix resin is heated using a first non-contact type heating unit so that the matrix resin is impregnated into the inside of the reinforcing substrate, whereby a laminar composite made of the matrix resin and the reinforcing substrate is obtained, (c) a second coating step in which the matrix resin is further applied to at least one of surfaces of the laminar composite using a second die coater, and (d) a second heating step in which the laminar composite is heated using a second non-contact type heating unit so as to semi-harden the matrix resin.

According to the above production process for the prepreg according to the present invention, the matrix resin is supplied to the reinforcing substrate in the first coating step in at least such an amount that substantially all of the voids of the reinforcing substrate are filled with the matrix resin. The voids include any void present in the reinforcing substrate. For example, the voids include a space between fibers (i.e. a micro void) and a space between bundles of the fibers (i.e. a macro void). Generally, a total volume of the micro voids is relatively smaller than that of the macro voids so that the micro voids may usually be negligible small. Practically, the "amount of the matrix resin which the reinforcing substrate is able to contain in its total void" may be determined by using a thickness and a woven mesh of the reinforcing substrate. For example, when the sheet-shaped reinforcing substrate has a sheet area [A (m$^2$)], a thickness [B (m)], a woven mesh [C g/m$^2$], and a net density of a material [D (g/cm$^3$)] which forms the reinforcing substrate, the "amount of the matrix resin which the reinforcing substrate is able to contain in its total void" [E (m$^3$)] may be calculated according to the following equation:

$$E = A \times B - A \times C/D$$

Thus, the amount "E" corresponds to a minimum amount of the matrix resin which is applied in the first coating step. In the first heating step, the applied matrix resin is heated so that the resin penetrates into substantially all voids of the reinforcing substrate. The first heating step reduces a viscosity of the matrix resin so that it promotes the penetration of the matrix resin by means of the capillarity into the inside of the reinforcing substrate. The amount of the matrix resin may be more than the minimum amount in the first coating step. During the first heating step, since nothing contacts with a surface of the coated matrix resin or a non-coated surface of the reinforcing substrate (although surrounding atmosphere (for example air) contacts with the surfaces), bubbles can easily get out of the inside of the resin and the reinforcing substrate. Further, the matrix resin is supplied to the surface of the composite in the second coating step, and heated in the second heating step which reduces the viscosity of the applied matrix resin so that the bubbles further get out of the inside of the resin and the reinforcing substrate and simultaneously semi-hardened, finally resulting in the prepreg.

In the first coating step, the matrix resin may be applied to a top surface (or side) of the reinforcing substrate provided that the reinforcing substrate moves not vertically, but, for example, substantially horizontally. As described below, the first coating step applies the matrix resin to a bottom surface (or side) of the substrate. The second coating step may apply the matrix resin to the bottom side and/or top side of the reinforcing substrate. In one preferable embodiment, the second coating step applies the matrix resin to the bottom side when the first coating step applies the resin to the top side of the reinforcing substrate.

There is also provided an apparatus for producing a prepreg by the present process as described above which comprises an unwinding unit of a reinforcing substrate, an accumulator unit which works upon exchange of a reinforcing substrate feed roller so as to continue the process, storage tanks which keep a main composition (A), a hardener composition (B), and a is hardening promoter composition (C) at predetermined temperature in their fluidic states respectively, metering devices which dispense the compositions from the tanks respectively, a mixing unit which mixes the metered compositions together to prepare a matrix resin, a first die coater which applies the matrix resin to the reinforcing substrate, a first non-contact type heating unit which impregnates the reinforcing substrate with the matrix resin to form a laminar composite, a second die coater which applies the matrix resin to the laminar composite, a second heating unit which semi-hardens the matrix resin which the laminar composite contains, a compaction roller unit which presses and smooths the reinforcing substrate impregnated with the matrix resin and which also keeps the reinforcing substrate at a predetermined temperature, and a wind-up roller which winds up the produced prepreg or a cutting unit which cut the produced prepreg transversely.

As in the process of the present invention described above and below, using the apparatus just described above, the matrix resin is uniformly impregnated into the reinforcing substrate through the first heating unit so that bubbles get out of the inside of the reinforcing substrate including the matrix resin through its surfaces. Further, the second coating unit further supplies the matrix resin to the surface of the laminar composite and the second heating unit produces the prepreg of which matrix resin has been totally and uniformly semi-hardened.

BRIEF DESCRIPTION OF THE DRAWINGS

FIG. 2 schematically shows states of a matrix resin and a reinforcing substrate in cross-section views during the process of the present invention using the apparatus shown in FIG. 1 wherein

FIG. 5 schematically shows states of a matrix resin and a reinforcing substrate in cross-section views during the process of the present invention using the apparatus shown in FIG. 4 wherein

FIG. 22 schematically shows a back-up roller of the apparatus shown FIG. 21 wherein

FIG. 26 schematically shows states of a matrix resin and a glass cloth in cross-sectional views during the process of the present invention using the apparatus shown in FIG. 25 wherein FIG. 26(a) shows the state just after a first coating step, FIG. 26(b) shows the state just after a first heating step, and FIG. 26(c) shows the state just after a second coating step.

Figure 1:
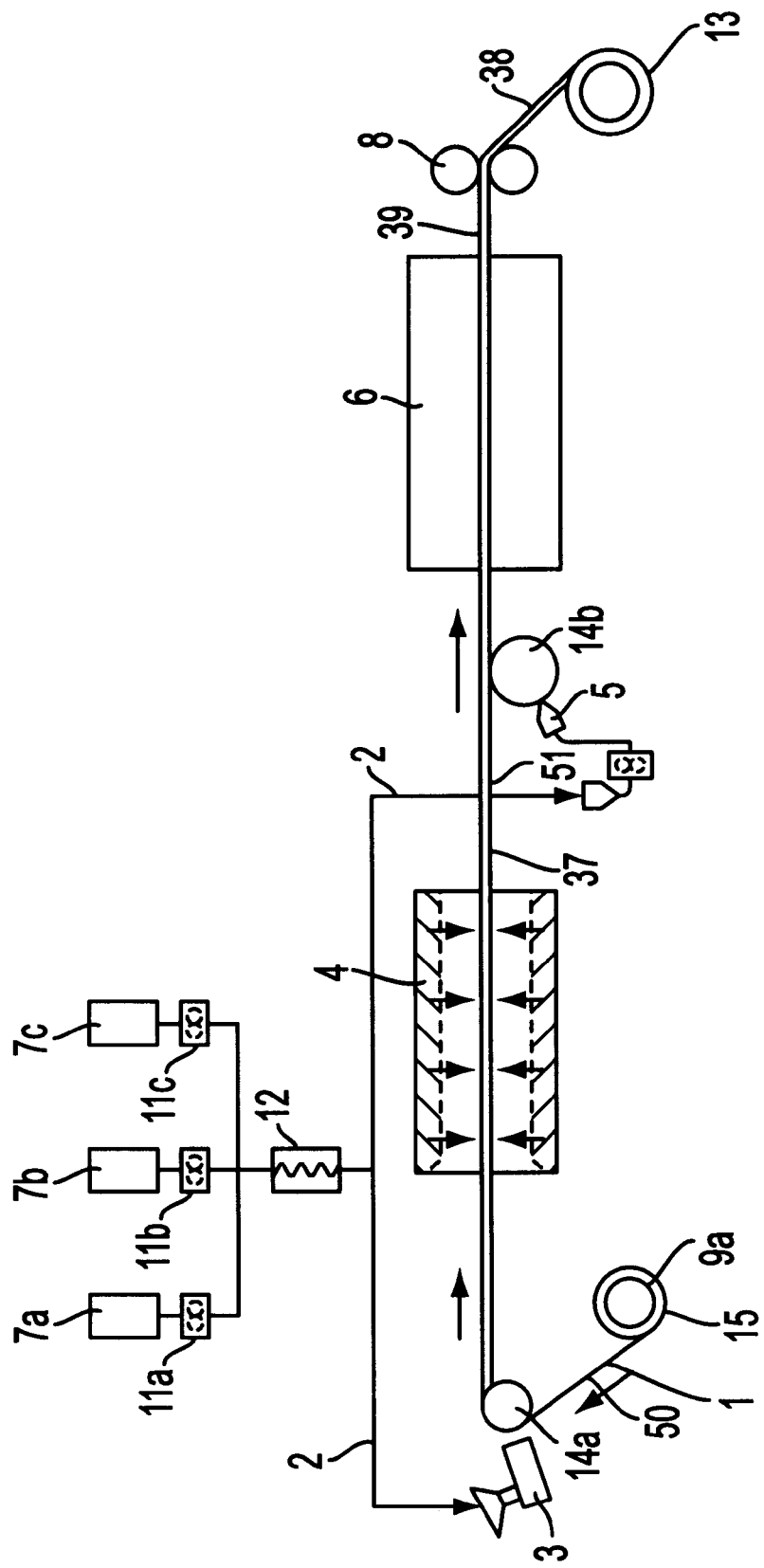
FIG. 1 schematically shows a first embodiment of an apparatus for producing a prepreg according to a process of the present invention.

In the drawings, numerals denote as follows:

| 1:   | reinforcing substrate | 2:   | matrix resin |
|------|----------------------|------|-------------|
| 3:   | first die coater     | 4:   | first heating unit |
| 5:   | second die coater    | 5a:  | second die coater outlet |
| 6:   | second heating unit  | 7a:  | storage vessel |
| 7b:  | storage vessel       | 7c:  | storage vessel |
| 8:   | compaction roller    | 9:   | unwind roller |
| 9b:  | stand-by roller      | 10:  | accumulator |
| 11a: | metering device      | 11b: | metering device |
| 11c: | metering device      | 12:  | mixing unit |
| 13:  | wind-up unit         | 14a: | back-up roller |
| 14b: | back-up roller       | 15:  | unwind unit |
| 21:  | double belt press    | 22:  | unwind unit |
| 23:  | extruder             | 24:  | displacement meter |
| 24a: | displacement sensor  | 24b: | amplifier |
| 25:  | overlapping portion  | 26:  | double-sided adhesive tape |
| 30a: | heating zone         | 30b: | heating zone |
| 30c: | heating zone         | 31:  | void |
| 32:  | CCD camera           | 33:  | monitor |
| 34a: | press roller         | 34b: | press roller |
| 35a: | smoothing roller     | 35b: | smoothing roller |
| 36:  | back light           | 37:  | laminar composite |
| 38:  | prepreg              | 40:  | coating layer |
| 41:  | matrix resin         | 42:  | coating layer |
| 50:  | top side             | 51:  | bottom side |
| 52:  | yam                  | 53:  | bundle |

DETAILED DESCRIPTION OF THE INVENTION

In a preferable embodiment of the process according to the present invention, the matrix resin comprises components of (A) an epoxy resin composition as a main component, (B) a resin composition comprising at least a hardener, and (C) a hardening promoter. Each component is kept in a fluidic state. All the component are mixed together uniformly, and supplied to the first and/or the second die coaters. Thus, since the epoxy resin composition (A) does not contain the hardener and the hardening promoter before being mixed, so that no hardening reaction occurs before the mixing and the matrix resin may be stably stored for a long time. Further, since the resin composition (B) does not contain the hardening promoter, the hardener does not react with the promoter so that its quality is stably kept That is, in the embodiment as described above, each component can be stably stored for a long time. Thus, no attention has to be paid on a pot-life of the matrix resin.

In a more preferable embodiment, each component has a viscosity in the range between 500 and 500000 centipoise (cPs) when it is supplied from its storage tank to a mixer where all the components are mixed together. In addition, the mixture of the components which is transferred from the mixer to the die coater as a matrix resin preferably has a viscosity in the range between 500 and 500000 cPs. When the viscosity is less than 500 cPs, the matrix resin may easily pass though the reinforcing substrate and deposit on a back-up roller. When the viscosity is more than 500000 cPs, the matrix resin may have insufficient spreadability on the reinforcing substrate so that a uniform coating on the reinforcing substrate surface may not be ensured Further, each component or the mixture is desirably filtered to exclude any contaminant (such as dusts from the surrounding air or gelation products). The specified viscosity is advantageous for the smooth filtration.

In a preferable embodiment of the process according to the present invention, the amount of the matrix resin to be applied in the first coating step includes, in addition to the minimum amount of the resin, an amount which is necessary to form a coating on the surface (i.e. a coating side) of the reinforcing substrate to which surface the matrix resin is applied, and the second coating step applies the matrix resin to a surface of the reinforcing substrate (i.e. non-coating side) which surface is opposite to the surface to which the matrix resin is applied in the first coating step. An amount of the resin applied in the second coating step corresponds to an amount which is necessary to form a coating on the non-coating side in the first coating step. In this embodiment, since the first coating step not only impregnates the reinforcing substrate with the matrix resin but also forms the coating layer on one side of the reinforcing substrate, the second coating step only has to the other coating layer on the other side of the reinforcing substrate, which step can be carried out easily.

In a preferable embodiment of the process according to the present invention, the amount of the matrix resin to be applied in the first coating step is substantially equal to the minimum amount of the matrix resin, and the second coating step applies the matrix resin to either side of the reinforcing substrate (i.e. the laminar composite) in such an amount that a coating is formed on either surface of the reinforcing substrate. In this embodiment, substantially the same application conditions may be used for the second coating step to form the coatings on the both sides, so that a thickness of the coating layer of the matrix resin on one side of the reinforcing substrate may be the same as that on the other side.

In a preferable embodiment of the process according to the present invention, the first heating step further comprises additional heating step at an inlet or/and an outlet of the first heating unit. In this embodiment, the additional heating step prevents temperature decrease at the inlet or/and the outlet, so that a zone in which a predetermined temperature is to be kept (which zone may be regarded as an effective impregnation zone) may be extended and sufficient impregnation of the resin matrix into the reinforcing substrate is ensured.

In a preferable embodiment of the process according to the present invention, the second heating step is carried out such that a heating temperature is increased toward an outlet of the second heating unit. In this embodiment, since the heating temperature is relatively lower in an inlet portion of the heating unit, the viscosity of the matrix resin which has not been hardened so much is not excessively lowered because of the relatively low temperature so that the matrix resin may not pass thought the reinforcing substrate. Thus, no sag from the reinforcing substrate occurs. Further, the relatively higher temperature toward the outlet causes the speedy hardening of the matrix resin.

In a preferable embodiment of the process according to the present invention, the process further comprises the step in which the composite is pressed while being heated using compaction rollers during or after the second heating step. In this embodiment, the pressures of the compaction roller make the thickness of the prepreg uniform and the surface smoothness of the prepreg is ensured.

In a preferable embodiment of the process according to the present invention, the process further comprises the step in which a thickness of the reinforcing substrate is detected before the reinforcing substrate is supplied to the first die coater so that a clearance between the first die coater and a back-up roller is adjusted depending on the detected thickness of the reinforcing substrate. In this embodiment, for example, when an end portion of a reinforcing substrate is supplied while attached to and overlapped with a beginning portion of another reinforcing substrate of a stand-by roller in a continuous production mode, the double thickness of the overlapping portion is detected and the clearance between the first die coater and the back-up roller is adjusted to increase so that the overlapped portion smoothly passes through the clearance without catching. Thus, breakage of the reinforcing substrate is prevented, and continuous production of the prepreg can be smoothly carried out.

In a preferable embodiment of the process according to the present invention, temperatures of the die coater and the back-up roller of the first coating step are adjusted to properly reduce or increase the viscosity of the matrix resin depending on, for example, a thickness, a woven mesh and/or a woven density of the reinforcing substrate (these factors affect gas (or air) permeability of the substrate). A measure for the temperature adjustment is such that the temperature is higher when an extent of the gas permeability is lower. In this embodiment, when the reinforcing substrate has a different a thickness, a woven mesh and/or a woven density, the temperatures of the die coater and the back-up roller are changed based on the above measure, the matrix resin is prevented from reaching the back-up roller. Thus, the matrix resin is prevented from on the back-up roller and the reinforcing substrate from attaching to the back-up roller through the matrix resin.

In a preferable embodiment of the process according to the present invention, the heating temperature of the first heating step is adjusted to properly reduce or increase the viscosity of the matrix resin depending on the gas permeability of the reinforcing substrate (which is affected by for example a thickness, a woven mesh and/or a woven density of the reinforcing substrate). In this embodiment, a measure of the temperature adjustment may be the same as that in the case of the temperature adjustment of the die coater and the back-up roller as described just above. In this embodiment, an amount of the matrix resin which reaches bottom side (cf. the first coating side corresponds to the top side) of the reinforcing substrate may be unified so that amounts of the matrix resin the top side and on the bottom side of the reinforcing substrate are substantially equal.

In a preferable embodiment of the process according to the present invention, the first heating step heats each of a plurality of longitudinal portions of the reinforcing substrate separately (i.e. heating temperature is different along a width direction of the substrate). In this embodiment, when the gas permeability of the reinforcing substrate is different portion by portion transversely, a portion having a lower gas permeability can be heated to a higher temperature and vice versa, so that the amount of the matrix resin which reaches bottom side of the reinforcing substrate may be unified, which resulting in that the coating thicknesses on the top side and on the bottom side of the reinforcing substrate are substantially equal even though the reinforcing substrate has transversely different gas permeabilities. Generally, edge portions of the reinforcing substrate often may have a relatively large gas permeability.

In a preferable embodiment of the process according to the present invention, the present invention further comprises the step of detecting an impregnation state of the matrix resin into the inside of the reinforcing substrate (i.e. the presence of voids) between the first heating step and the second coating step and the heating temperature of the first heating step is adjusted so as to reduce the voids. A measure of the temperature adjustment is that temperature increase results in the reduction of the voids through the viscosity decrease of the matrix resin. In this embodiment, since the voids are reduced so that the impregnation of the matrix resin is sufficient in the inside of the reinforcing substrate.

In a preferable embodiment of the process according to the present invention, the present invention further comprises the step of detecting an amount of the matrix resin which reaches a side (i.e. non first coating side) of the reinforcing substrate which is opposite to the coating side in the first coating step (i.e. the first coating side) between the first heating step and the second coating step and the heating temperature of the first heating step is adjusted so as to unify the amount of the matrix resin which reaches the bottom side. A measure of the temperature adjustment is that temperature increase results in increase of the amount of the matrix resin which reaches the bottom side. In this embodiment, the reaching uniformity of the matrix resin is improved through the temperature adjustment so that thicknesses of the resin coatings on the top side and on the bottom side of the reinforcing substrate are substantially unified.

In a preferable embodiment of the process according to the present invention, the reinforcing substrate is supported by a back-up roller which rotates toward an opposite direction to the moving direction of the reinforcing substrate in the second coating step. In this embodiment, since the rotating direction of the back-up roller is opposite to the moving direction of the substrate, substantially no matrix resin accumulates between the back-up roller and the reinforcing substrate so that a constant amount of the matrix resin is supported by the reinforcing substrate.

In the above embodiment, a the reinforcing substrate is preferably supported by a back-up roller which rotates reversely at a circumferential speed larger than the moving speed of the reinforcing substrate in the second coating step, so that the matrix resin is smoothly applied to the reinforcing substrate and the resin coating formed in the second coating step becomes flat and smooth.

In a preferable embodiment of the process according to the present invention, the reinforcing substrate is forced down by pressing rollers before and behind the back-up roller in the second coating step, so that a constant contact area of the reinforcing substrate with the back-up roller is ensured, which uniformly smooths the resin coating formed in the second coating step.

In a preferable embodiment of the process according to the present invention, one surface or both surfaces of the reinforcing substrate is/are smoothed by a smoothing roller or rollers which rotate reversely to the moving direction of the reinforcing substrate between the second coating step and the second heating step so that the matrix resin layer on one or the both surfaces of the reinforcing substrate is/are uniformly smoothed.

In a preferable embodiment of the process according to the present invention, the matrix resin is applied to a bottom side of the reinforcing substrate in the first coating step, and the matrix resin is applied to a top side of the reinforcing substrate in the second coating step when the reinforcing substrate is transferred substantially horizontally. In this embodiment, since the resin matrix is applied to the bottom side of the substrate, excessive impregnation of the matrix resin toward or through the top side is avoided because of the gravity force effect, so that the thicknesses of the resin coating on the top side and on the bottom side of the reinforcing substrate may be unified.

In a preferable embodiment of the process according to the present invention, the second heating step heats each of a plurality of longitudinal portions of the reinforcing substrate including the matrix resin (i.e. the laminar composite) separately (i.e. heating temperature is different along a width direction of the substrate). In this embodiment, when a hardening degree of the matrix resin is different portion by portion, a portion in which the hardening degree is higher may be heated to a lower temperature so as to reduce the hardening degree. Thus, a prepreg having a uniform hardening degree along its width direction is produced.

In a preferable embodiment of the process according to the present invention, at least one of the first and the second heating steps is carried out such that the reinforcing substrate is transferred vertically so that the gravity effect along a thickness direction of the reinforcing substrate is minimized, which resulting in the uniform impregnation of the matrix resin into the substrate.

DESCRIPTION OF CONCRETE EMBODIMENTS

The present invention is further explained in detail by way of embodiments in which a reinforcing substrate is impregnated with a matrix resin with reference to the accompanied drawings.

FIG. 1 schematically shows a first embodiment of an apparatus with which the process for producing the prepreg is carried out according to the present invention, and FIG. 2 schematically shows states of the matrix resin and the reinforcing substrate in the steps of the process.

As shown in FIG. 1, the apparatus is arranged such that a sheet-shaped fabric reinforcing substrate 1 is continuously fed out from an unwind roller 9a, and the thermosetting resin 2 as the matrix resin is supplied to the reinforcing substrate 1 in a molten state and heated so that the prepreg is formed.

Concretely, the present process for producing the prepreg 38 carries out the following steps of:

(a) the first coating step in which the matrix resin 2 is applied to one surface, for example a top side 50, of the reinforcing substrate 1 using a first die coater 3, and an amount of the matrix resin to be applied is at least equal to an amount of the matrix resin which the reinforcing substrate is able to contain in its total voids as much as possible, (b) the first heating step in which the reinforcing substrate 1 is heated using the first non-contact type heating unit 4 so that the applied matrix resin 2 is impregnated into the inside of the substrate and the laminar composite 37 of the matrix resin and the reinforcing substrate is obtained, (c) the second coating step in which the matrix resin 2 is further applied to at least one of surfaces of the laminar composite 37, for example a bottom side 51 of the substrate, using the second die coater 5, and (d) the second heating step in which the laminar composite 37 including the applied matrix resin 2 in the second coating step is heated using the second non-contact type heating unit 6 so as to semi-harden the matrix resin 38.

Figure 2A:
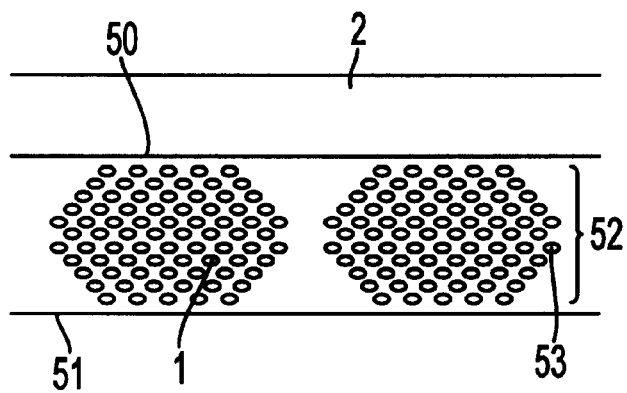
FIG. 2(a) shows the state just after a first coating step.
Figure 2B:
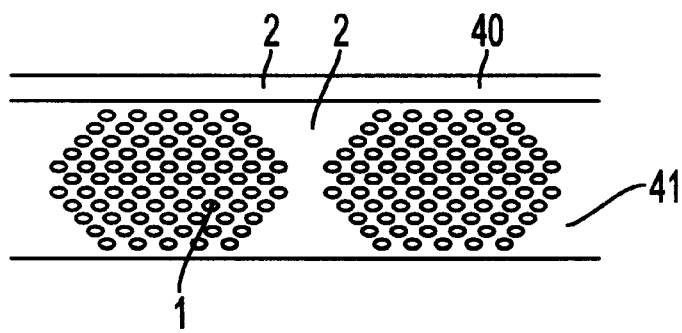
FIG. 2(b) shows the state just after a first heating step.
Figure 2C:
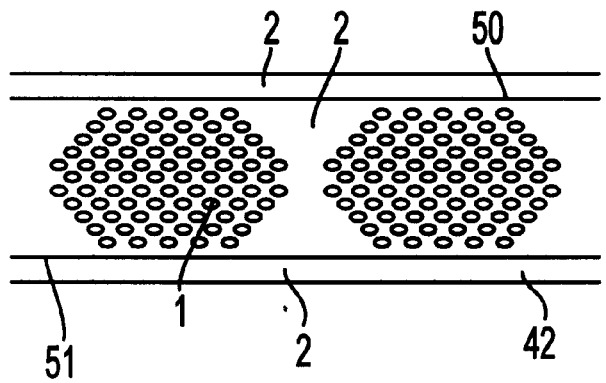
FIG. 2(c) shows the state just after a second coating step.

FIG. 2 schematically shows the states of the matrix resin 2 and the reinforcing substrate 2 in the steps of the above process. In FIG. 2, the reinforcing substrate which is composed of bundles 53 of yarns 52 is defined to by the top side 50 and the bottom side 51. It is to be noted that the top side 50 or the bottom side 51 is not truly present but a hypothetical surface which may be defined by a plane which includes the outer most portions on one side of the reinforcing substrate. Thus, the space between the sides 50 and 51 excluding the yarns 53 corresponds to a volume of the matrix resin that the reinforcing substrate is able to contain as much as possible. FIG. 2(a) corresponds to the state just after the first coating step wherein the applied matrix resin 2 attaches onto a top side 50 of the reinforcing substrate. When the reinforcing substrate 1 and the matrix resin 2 are heated by the first heating unit 4, the matrix resin 2 penetrates into the inside of the reinforcing substrate 1 mainly by means of the capirallity so that the reinforcing substrate 1 is wholly impregnated with the matrix resin 2 (whereby the laminar composite is formed which consists of the reinforcing substrate including the matrix resin 41 and the coating layer 40 of the resin on the top side 50 of the substrate), which state corresponds to FIG. 2(b). The embodiment shown in FIG. 2, the amount of the matrix resin supplied to the reinforcing substrate is more than the minimum amount as described above so that a coating layer 40 is formed on the top side 50 of the reinforcing substrate 1. It is noted that an amount of the resin which the reinforcing substrate can contain in its total void portions as much as possible corresponds to an amount of the resin which is included in the portion 41 except the bundles 52 of the yarns 53. When the amount of the matrix resin supplied to the reinforcing substrate is just the minimum amount as described above, substantially no coating layer 40 is formed on the first coating side 50 of the reinforcing substrate 1 and only the portion 41 is formed. Then, the second coating step applies the matrix resin to the opposite side 51 to the first coating side (i.e. the bottom side) of the reinforcing substrate 1 so as to form a coating layer 42 as shown in FIG. 2(c). In this embodiment, the application of the matrix resin in the second coating step in combination with the first coating step results in the two coating layers 40 and 42 on the both sides 50 and 51 of the reinforcing substrate 1. Generally, when a resin content is defined for the production of the prepreg, the content corresponds to an amount of the matrix resin which the reinforcing substrate contains within its inside and outside. Thus, resin content of the embodiment shown in FIG. 2 is a total amount of the matrix resin of 40+41+42 (excluding the reinforcing substrate 1). When the resin content is expressed by percentage, it is based on the total weight of the prepreg. When the resin content is expressed per unit area, the unit of the content is gram-resin/m²-prepreg.

It is to be noted that when the woven mesh of the fabric (for example glass cloth) as the reinforcing substrate 1 is excessively open and/or the viscosity of the matrix resin 2 is low so that the penetration of the matrix resin proceeds speedy, the coating layer 42 in addition to the coating layer 40 may be formed upon the first coating step, which is not preferable. It is also to be noted that there is no clear border between the layer 40 or 42 and the reinforcing substrate having the matrix resin 41. For ease of consideration, the prepreg or its precursor is hypothetically divided into those parts.

The second heating step (d) heats the composite having the coatings (40 and 42) using the heating unit 6, whereby the matrix resin 2 is properly semi-hardened (i.e. hardened up to so-called B-stage) so that the prepreg in which hardening has been proceeded to some extent is obtained.

The first and the second heating units 4 and 6 are of a non-contact type. Thus, when the reinforcing substrate 1 is totally impregnated with the matrix resin 2 in the first heating step, the reinforcing substrate (or the composite) is in contact with nothing so that the top and the bottom sides thereof are free, so that bubbles inside the matrix resin and/or the reinforcing substrate can easily get out of them through the free sides. Thus, the produced prepreg includes less voids and preferably substantially no voids left therein. In addition, in the second heating step, the bubbles easily get out of the inside because of the similar mechanism as described above, whereby the produced prepreg includes much less voids. Further, since the impregnation proceeds uniformly, the produced prepreg has improved surface smoothness and resin content uniformity throughout the prepreg.

It is an important feature of the present invention that the first heating unit 4 is of the non-contact type because the substrate 1 is almost wholly and preferably substantially wholly impregnated with the matrix resin in the first coating step.

As the reinforcing substrate 1, any fabric material such as glass cloth may be used. Other sheet-shaped material is also possible. For example, a woven or non-woven fabric made of various materials such as an inorganic fiber or organic fiber (for example, an aromatic polyamide fiber, an aromatic polyester fiber and a carbon fiber) may be used. It is also possible to continuously feed out bundles of fibers as described from rollers to form a reinforcing substrate without a weft.

As the thermosetting resin as matrix resin 2, various thermosetting resin such as an epoxy resin may be used. There is no specific limitation provided that the resin does not adversely affect the prepreg, and further for example the following may be used: an unsaturated polyester resin, a polyurethane resin, a viniyl ester resin, an acrylate resin, a phenol resin and so on.

Typically, the prepreg produced according to the present invention is used for various applications, for example for the production of a multi-layered circuit substrate, and in such a substrate a glass/epoxy prepreg produced by the present invention may be used. However, the prepreg according to the present invention may be used not only for the production of electrically related articles but also for the production of other field related articles such as a decorative sheet or a structural laminate.

The production of the prepreg according to the present invention will be hereinafter further explained in detail by way of an example of a prepreg substantially consisting of a glass cloth as the reinforcing substrate and an epoxy resin as the matrix resin, but the present invention is not limited to such an example.

In FIG. 1, the feed-out unit 15 continuously supplies the glass cloth as the reinforcing substrate 1 from an unwind roller 9a. As the glass cloth, one may be used which has a thickness in the range between 0.03 and 0.2 mm and a woven mesh in the range between 25 and 250 g/m². Using such glass cloth, the resin content may be adjusted in the range between 40 and 75% by weight of the weight of the prepreg to be produced.

The storage vessels 7a, 7b and 7c contains the components (A), (B) and (C) for the matrix resin 2, respectively. The components are dispensed to the mixing unit 12 through the metering devices 11a, 11b and 11c at predetermined rates. The components are mixed together in the mixing unit 12 so as to prepare the matrix resin 2, which is then supplied to the first die coater 3 and the second die coater 5 and applied to the reinforcing substrate 1.

The matrix resin 2 is applied to a surface (e.g. a top side 50) of the glass cloth 1 which is supported by the back-up roller 14a using the first die coater 3. Using the second die coater 5, the matrix resin 2 is applied to the back-up roller 14b which supports the reinforcing substrate 1 upward with the coated side (of the substrate by the first die coater) up, and then the applied resin is transferred to an opposite surface (i.e. non-coated bottom side) of the reinforcing substrate 1.

For the applications of the matrix resin, the first die coater 3 may be of a gear-pump-in-die type which includes a built-in gear pump for the purpose of metering, and the second die coater 5 may be of a T-shaped die type which does not include a gear pump but which has the gear pump outside. However, the die coater is not limited to those in the above embodiment, and other die such as coathanger die, a fish-tail die or a fan-shape die may be used.

An amount of the matrix resin applied by the first die coater 3 may be 70 to 90% of the total amount resin which is applied to the substrate overall (i.e. the resin content of the prepreg), and the balance (i.e. 30 to 10%) of the resin may be applied by the second die coater 5.

The compaction rollers 8 press the composite 39 consisting of reinforcing substrate 1 impregnated with the matrix resin 2 and the applied matrix resin coatings inside and outside the substrate 1 so as to unify the thickness of the composite 39 and smooth its surfaces. The compaction rollers 8 are kept at a predetermined temperature at which the matrix resin (in the semi-cured state) may be softened, and they are located at an outlet side of the second heating unit 6 in the embodiment shown in FIG. 1.

The compaction rollers 8 may be positioned inside the second heating step, in place of or in addition to, in the outlet side of the second heating unit 6. Thus, the second heating unit 6 may be divided into at least two parts and the compaction rollers may be positioned between those parts. Further, a plural pair of the compaction rollers may be positioned at different positions.

The reinforcing substrate 1 impregnated with the matrix resin 2 is thermally pressed with the compaction rollers as described above so that the thickness of the prepreg 38 produced is unified and its surface is smoothed. The prepreg 38 is continuously wound up with a wind-up roller 13 behind the compaction rollers 8. In place of the wind-up roller 13, a cutting unit may be provided which cuts the prepreg transversely to produce a prepreg sheet having a predetermined length.

The component (A) contained in the storage vessel 7a is an epoxy resin compositions as a main component which comprises at least one resin of for example a bisphenol type. The component (B) contained in the storage vessel 7b comprises a hardener (such as dicyandiamide) which is mixed with a relevant less reactive resin composition so as to improve meltability at a storage temperature. The component (C) contained in the storage vessel 7c comprises a hardening promoter such as a imidazole compound. Each of the components (A), (B) and (C) is kept at a predetermined temperature so that its fluidic state is stably maintained. The components are mixed together intimately, and then supplied to the first die coater 3 and/or the second die coater 5.

In one embodiment, the storage vessel 7a contains, as the main component, a resin composition at a temperature of about 65° C. in a liquid state which comprises a bisphenol type epoxy resin (as a main component), a brominated epoxy resin and a polyfunctional epoxy resin; the storage vessel 7b contains an epoxy resin composition at a temperature of about 40° C. which comprises dicyandiamide as the hardener; and the storage vessel 7c contains an imidazole based hardening promoter at a temperature of about 40° C. Those components (A), (B) and (C) are mixed by a static mixer (24 stages, average residence time: one minute) as the mixing unit 12, and then supplied to the die coaters 3 and 5 which are kept at a temperature of 60° C.

When the components (A), (B) and (C) are stored and supplied as described above, they do not react even in liquid states at elevated temperatures, so that they can be stably stored for a long time, which results in improved production efficiency.

Although not shown in the drawings, each component may be filtered on the way to the mixing unit 12 or the mixed components (i.e. the matrix resin to be applied) may be filtered on the way to the die coaters 3 and 5 so as to remove any contaminants such as dusts and gel materials. The removal of the contaminants improves the uniform impregnation of the matrix resin 2 and produces the prepreg which contains less contaminants. A viscosity of each component or the matrix resin is preferably in the range in between 500 and 500000 cPs (centipoise), and more preferably between 500 and 10000 cPs. The filtration is preferably carried out when the viscosity of the component or the matrix resin is in such a specified range. When the viscosity is at least 500 cPs, the matrix resin does not excessively pass through the reinforcing substrate, so that a relatively larger amount of the matrix resin hardly reaches the other side (i.e. the bottom side) of the reinforcing substrate which is opposite to the coating side. Thus, the matrix resin hardly attaches to the back-up roller, which suppresses occurrence of an operation trouble due to such attachment of the matrix resin. In addition, when the viscosity is not more than 500000 cPs, the matrix resin usually has sufficient spreadability which ensures the uniform application onto the reinforcing substrate 1.

Figure 3:
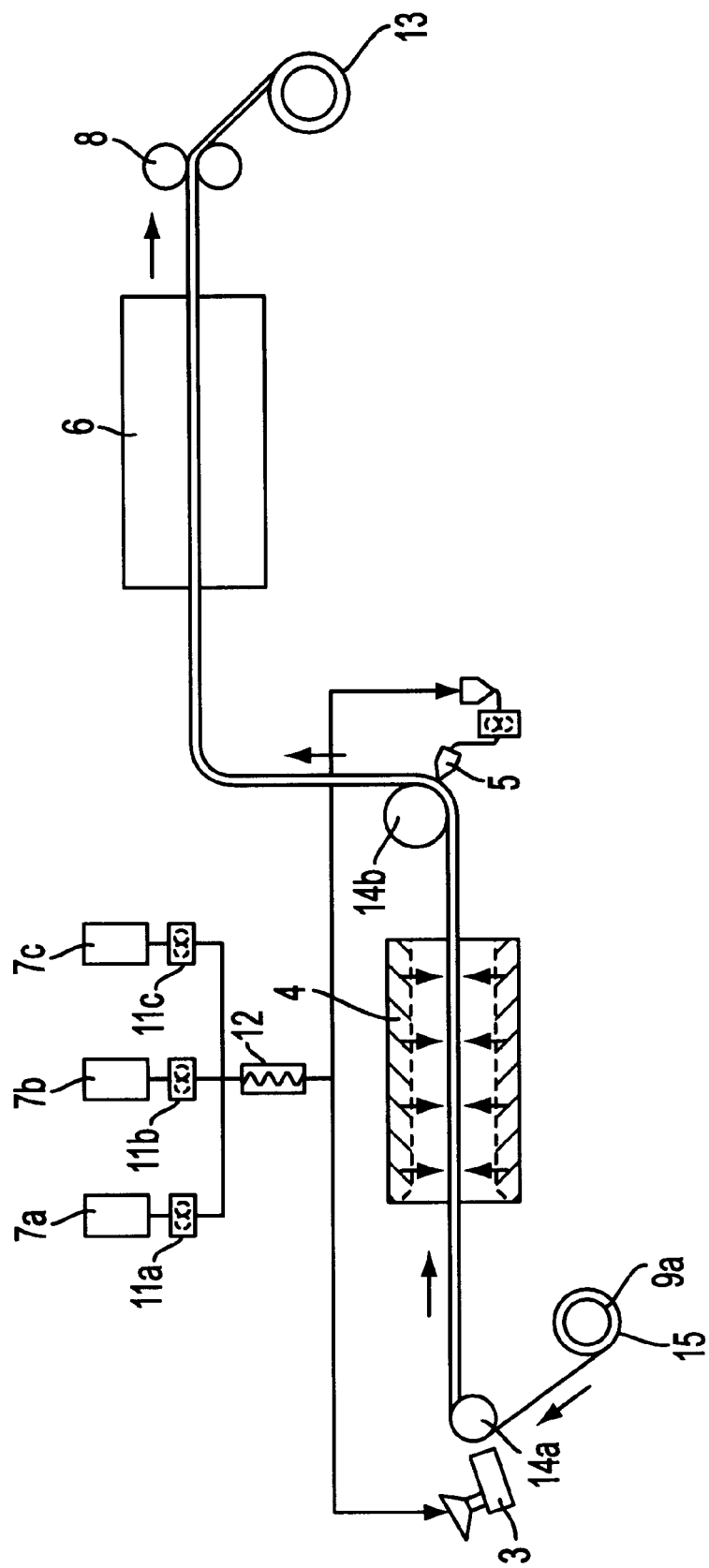
FIG. 3 schematically shows a second embodiment of an apparatus for producing a prepreg according to a process of the present invention.

FIG. 3 schematically shows a second embodiment of the apparatus which carries out the process for producing the prepreg according to the present invention.

In the apparatus as shown in FIG. 3, the back-up roller 14b is positioned on the same side of the reinforcing substrate 1 as the first coating side with the first die coater 3, and the second die coater 5 is positioned on the other side so that the second die coater 5 directly contacts with the reinforcing substrate 1. Thus, the second die coater 5 directly applies the matrix resin 2 to the reinforcing substrate 1. These are different from the first embodiment shown in FIG. 1.

As described above, either of the above two application manners of the matrix resin 2 to the reinforcing substrate 1 may be used: One is the application of the matrix resin 2 to the back-up roller 14b followed by transferring the matrix resin 2 to the reinforcing substrate 1; and the other is the direct application of the matrix resin 2 to the reinforcing substrate 1. The selection of the application manner is usually based on consideration of various factors such as an available space and a cost for facilities. Particularly, when the matrix resin is once applied to the back-up roller 14b, the clearance between the die coater 5 and the back-up roller can be precisely controlled so that an amount of the applied matrix resin is easily controlled. In this case, a rotation direction of the back-up roller 14b may be the same as or opposite to the moving direction of the reinforcing substrate 1. Preferably, the rotation direction is reversely to the moving direction.

Figure 4:
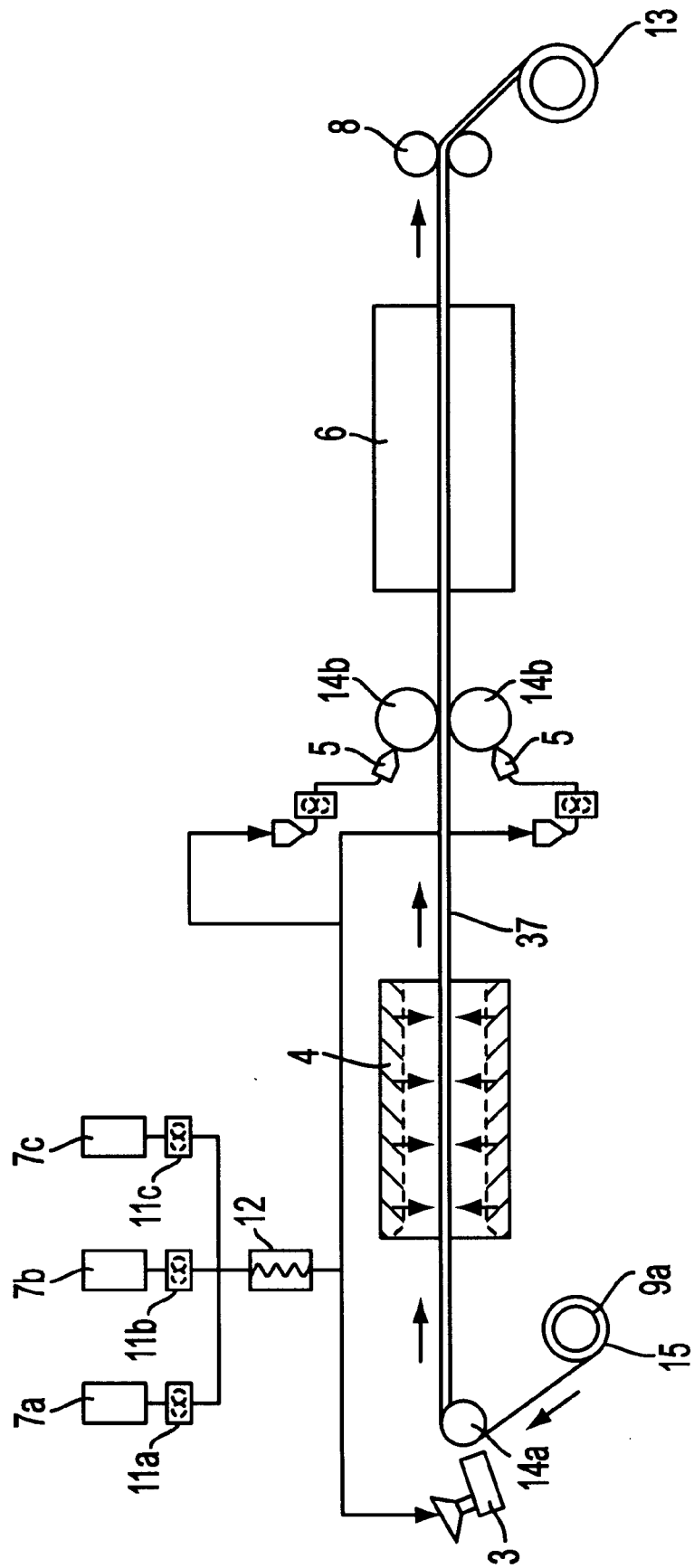
FIG. 4 schematically shows a third embodiment of an apparatus for producing a prepreg according to a process of the present invention.

FIG. 4 schematically shows a third embodiment of the apparatus which carries out the present process for producing the prepreg.

Differently from the embodiment shown in FIG. 1, in the apparatus as shown in FIG. 4, two second die coaters 5 are used so that one second die coater 5 is positioned on each side of the reinforcing substrate 1 (i.e. laminar composite 37). Thus, the matrix resin 2 is applied to the both sides of the substrate. In this case, the first coating step applies the matrix resin to the reinforcing substrate at the minimum amount The embodiment shown in FIG. 4 uses two back-up rollers 14b which sandwich and convey the reinforcing substrate, and transfer the matrix resin (which is applied by the die coater 5) to the reinforcing substrate.

When the application manner of the embodiment of FIG. 4 is used, the matrix resin is applied to the both sides of the reinforcing substrate 1 at the same conditions, so that it is easy to unify the thicknesses of the layers of the matrix resin 2 on the both sides of the reinforcing substrate.

For example, the application as described above with reference to FIG. 4 may be as follows: The reinforcing substrate 1 is a glass cloth which has a thickness of 180 $\mu$m and a woven mesh of 210 $g/m^2$, and an epoxy resin as described above with reference to FIG. 1 is applied. The first die coater 3 applies the matrix resin having a viscosity of about 6000 cPs. An amount of the matrix resin applied by the first die coater 3 is 80% of the matrix resin content which is totally applied in the production process, and such an amount (i.e. 80%) corresponds to a resin content of 122 $g/m^2$, which is just the minimum amount of the matrix resin for the glass cloth. Then, the glass cloth is heated by passing it through a far infrared heating furnace as the first heating unit 4 in 30 seconds so that the matrix resin 2 is impregnated into the glass cloth. Additional matrix resin 2 which has a viscosity of 6000 cPs is applied by the second die coaters 5 to the top side and the bottom side of the glass cloth. Ten percents of the matrix resin which is totally applied in the production process is applied to each side, and such an amount of the matrix resin corresponds to a resin content of 15 $g/m^2$ each. The matrix resin is semi-hardened (up to the so-called B-stage) when the reinforcing substrate 1 including the matrix resin 2 passes through the second heating unit 6.

Figure 5A:
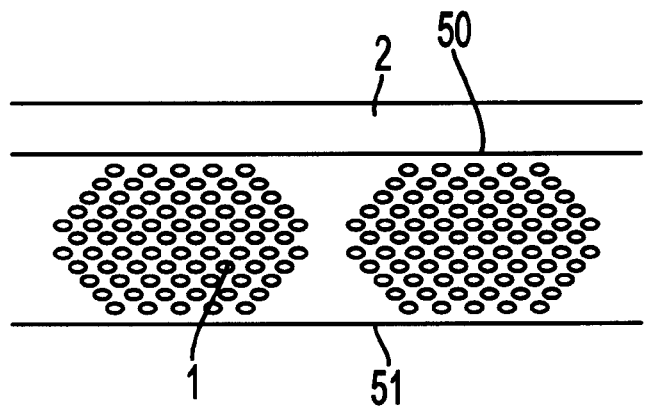
FIG. 5(a) shows the state just after a first coating step.
Figure 5B:
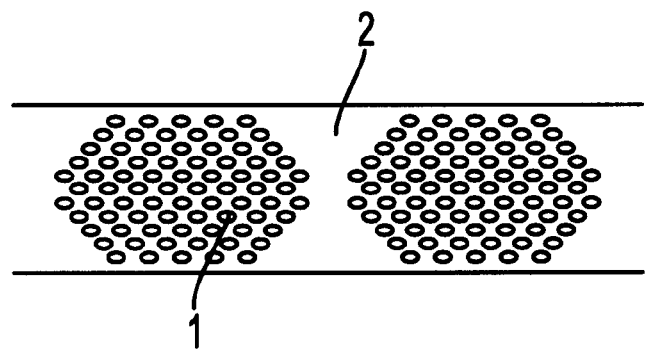
FIG. 5(b) shows the state just after a first heating step.
Figure 5C:
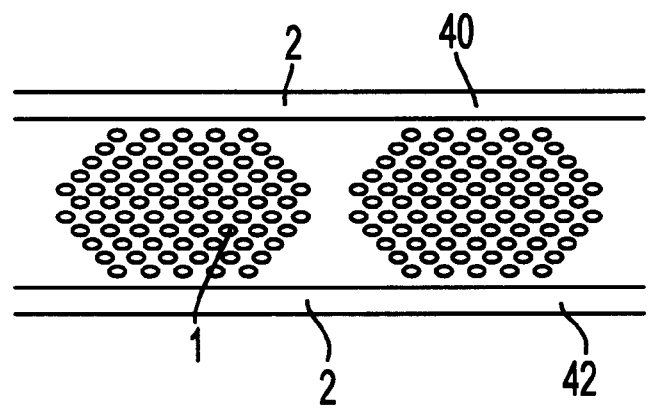
FIG. 5(c) shows the state just after a second coating step.

FIG. 5 schematically shows the states of the reinforcing substrate 1 and the matrix resin 2 in the above application using the apparatus shown in FIG. 4. FIG. 5(a) corresponds to the state lust after the application of the matrix resin 2 through the first coating step, showing that the matrix resin 2 is on the top surface of the reinforcing substrate 1. When such a substrate is passed through and heated in the second heating unit 4, the state is converted to that as shown in FIG. 5(b). It is noted that the amount of the applied resin in the first coating step is the minimum amount, so that no layer of the matrix resin is formed on either side of the substrate. However, the second coating step supplies the additional matrix resin 2 on the both sides 50 and 51 of the substrate, the two matrix resin coatings 40 and 42 are formed on the both sides as shown in FIG. 5(c).

In any of the present processes as described above and below, it may be preferable to provide an additional heating unit at an inlet or/and an outlet of the first heating unit 4. Such an additional heating unit prevents heating temperature decrease at the inlet or/and the outlet of the first heating unit 4 so that a zone which is to be kept at a predetermined temperature in the first heating step may be extended, which results in sufficient impregnation of the matrix resin.

As an example of the additional heating unit, an near infrared heater which irradiates rays having a wavelength of 0.75 to 2.0 μm may be provided at the inlet or land the outlet of the first heating unit 4 so that the substrate is heated by such a heater for 5 seconds. In this case, the other portion of the first heating unit may be a far infrared heater which irradiates rays having a wavelength of 25 to 5000 μm.

Figure 6:
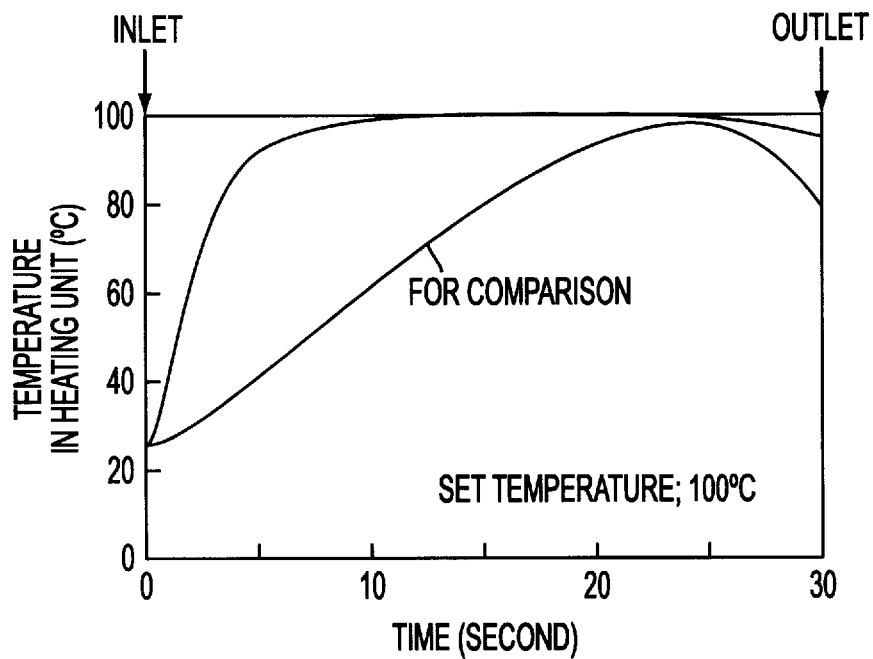
FIG. 6 schematically shows a difference in a temperature distribution between the presence and the absence of additional heating in a first heating step.

FIG. 6 is a graph showing a temperature distribution in the first heating unit (far infrared heater) with the additional heating units at the inlet and the outlet of the first heating unit 4. For comparison, a temperature distribution in the case without any additional heating is also shown in the graph. The first heating temperature is set to 100° C. in the both cases. In the graph, a horizontal axis denotes a time after entering the first heating unit 4 which corresponds to a longitudinal position of the heating unit 4 from the inlet. Since the heating unit is designed such that the substrate 1 is passed through the heating unit 4 in 30 seconds, the time "0" denotes the inlet of the heating unit and the time "30 seconds" denotes the outlet of the outlet.

As seen from FIG. 6, although the set temperature is 100° C., the temperature in the heating unit equipped only with the far infrared heater gradually increases without the additional heating, and reaches about 100° C. in 25 seconds and reduces to 80° C. at the outlet. When the additional heating is carried out, the temperature reaches about 100° C. in five seconds and it hardly decreases even at the outlet thereafter.

Figure 7:
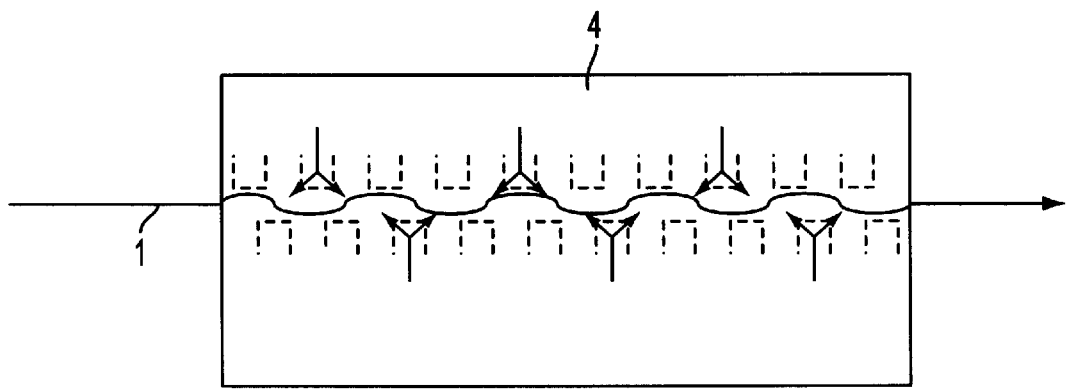
FIG. 7 schematically shows an heating unit which is an alternative to a far infrared radiation heater in a first heating step.

In place of the far infrared heater as described above, a heater as schematically shown in FIG. 7 may be used as the non-contact type heater. This heater is a floating dryer in which heated gas such as air or nitrogen is sprayed through a plurality of nozzles to the top and the bottom sides of the substrate 1 so that the substrate is floated while heated in the heater. Any other non-contact type heater such as one using a heating medium may be also used.

Figure 8:
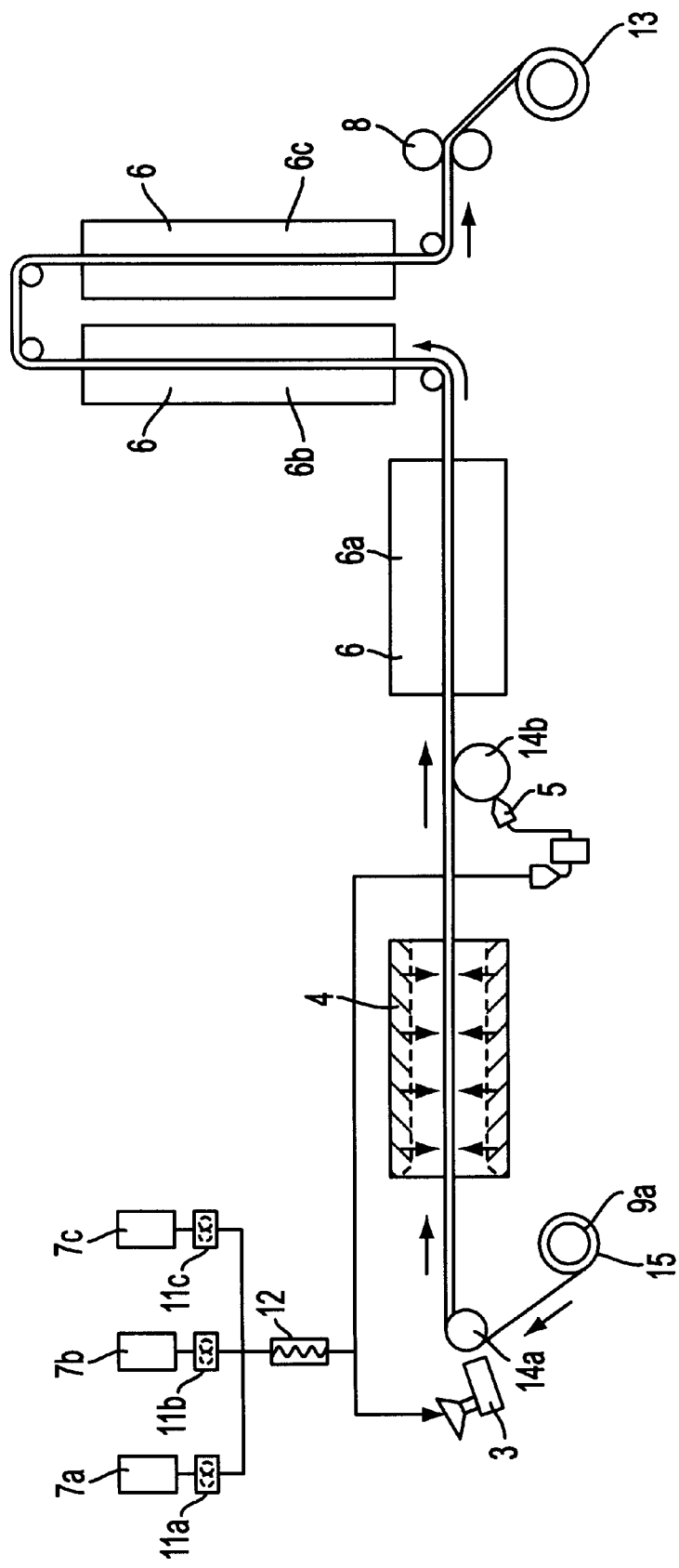
FIG. 8 schematically shows a fourth embodiment of an apparatus for producing a prepreg according to a process of the present invention.

FIG. 8 schematically shows a fourth embodiment of the apparatus which carries out the present process for producing the prepreg.

In the apparatus as shown in FIG. 8, the second heating unit 6 of the apparatus shown in FIG. 1 is divided into three parts 6a, 6b and 6c. The heating temperature of the part 6a is the lowest and that of the part 6c is the highest. The heater parts 6b and 6c are of a vertical heater type which saves installation area of the heater. When the divisional second heater is used, since the temperature in the inlet part 6a is not so high, the viscosity of the molten matrix resin is not excessively reduced even though the viscosity is not so high because of insufficient hardening of the matrix resin. Thus, sagging of the resin from the reinforcing substrate is prevented. Further, since the semi-hardening of the resin has been considerably promoted in the parts 6b or 6c because of the higher temperature therein, an efficiency as to production speed is improved.

As to a concrete extent of the semi-hardening reaction, for example, about 10% of a hardening degree may be achieved in the part 6a, and about 50% of the hardening degree may be achieved after the part 6c. The hardening degree herein used is based on a reaction ratio of the epoxy groups.

Figure 9:
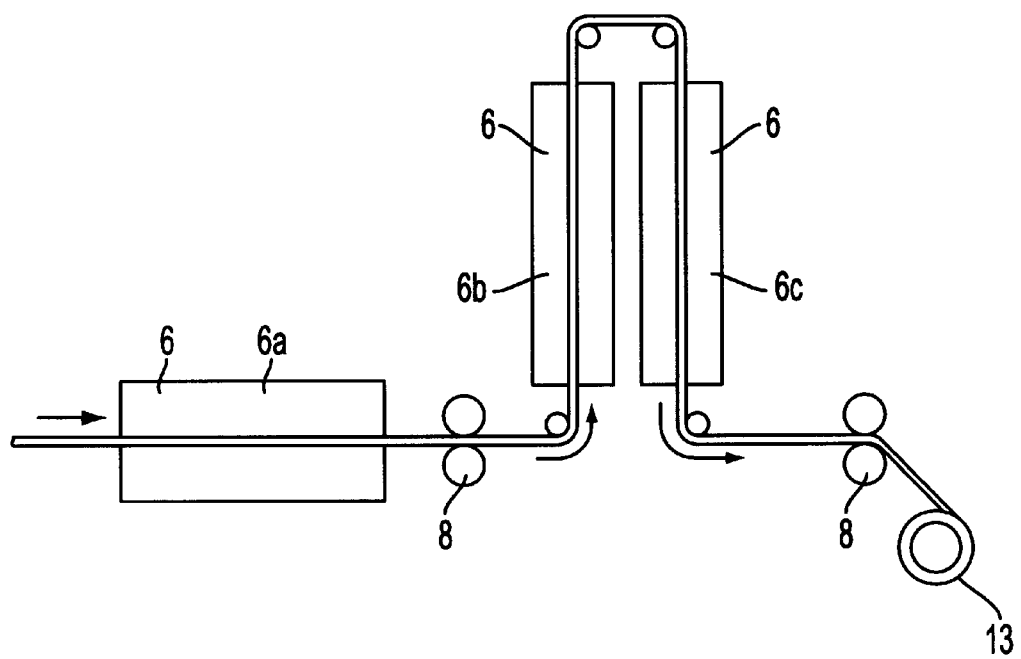
FIG. 9 schematically shows an alternative compaction roller arrangement in the embodiment shown in FIG. 8.
Figure 10:
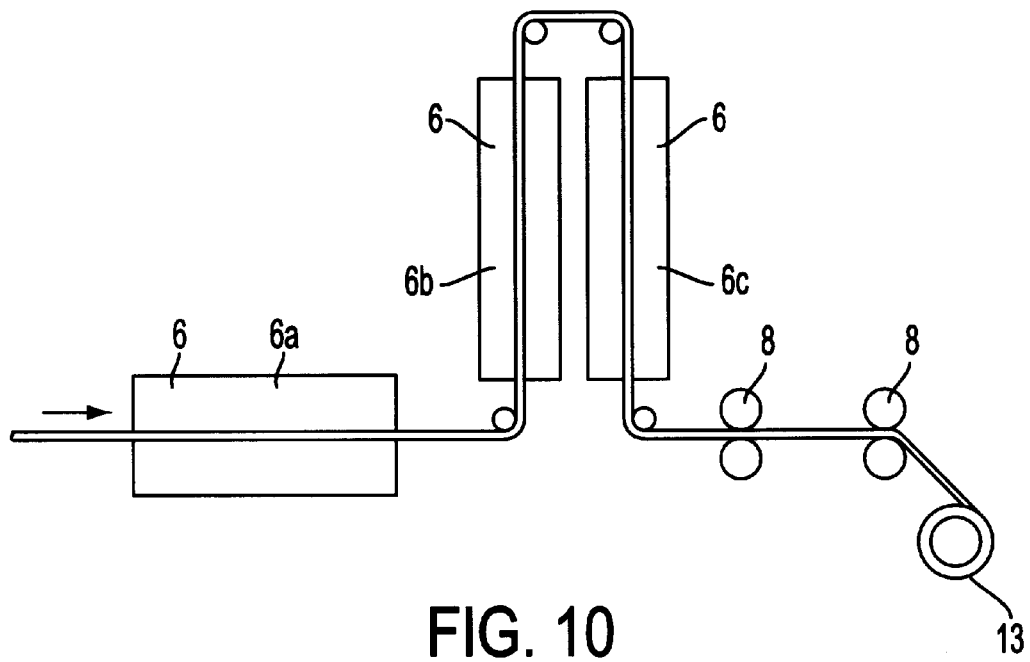
FIG. 10 schematically shows another alternative compaction roller arrangement in the embodiment shown in FIG. 8.
Figure 11:
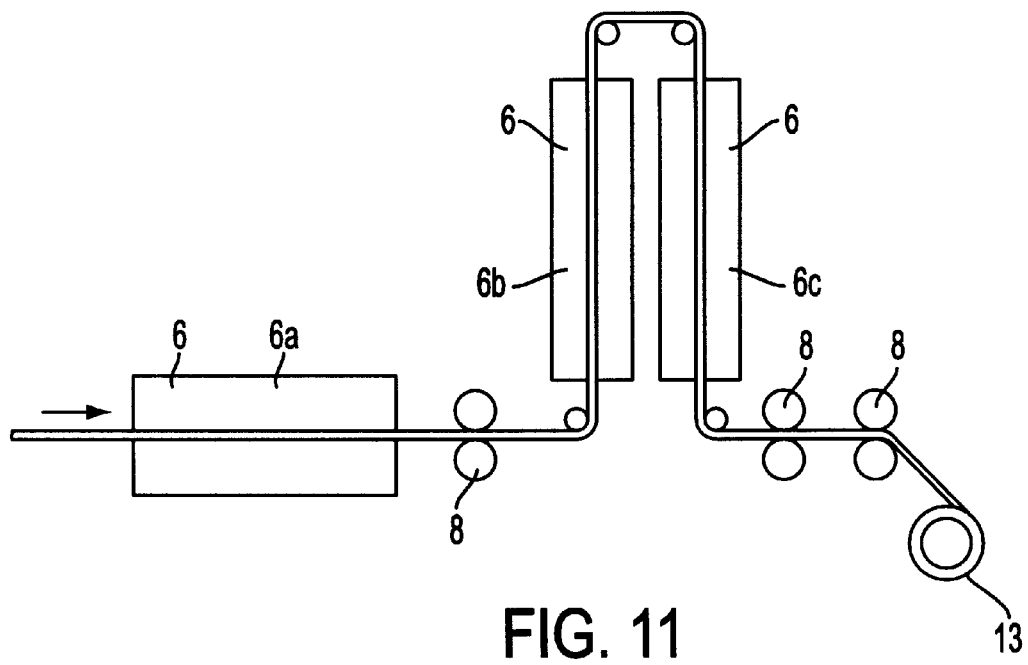
FIG. 11 schematically shows a further alternative compaction roller arrangement in the embodiment shown in FIG. 8.

FIGS. 9, 10 and 11 show alternative arrangements of the compaction rollers 8 in the apparatus shown in FIG. 8.

In the embodiment shown in FIG. 9, the compaction rollers 8 are provided also between the horizontal heating part 6a and the vertical heating part 6b. Those compaction rollers 8 effectively smooth the prepreg precursor surfaces and unify the thickness of the prepreg precursor since the hardening degree of the matrix resin after the part 6a is not so high and the resin is easily deformed where the rollers are disposed.

In the embodiment shown in FIG. 10, two sets of the compaction rollers 8 are provided in series after the second heating unit 6. A pressing force applied to the prepreg leaving the unit 6 is increased by those sets so that a pressing force by the rollers is increased, whereby the surface smoothness and the uniformity of the thickness of the prepreg are improved.

In the embodiment shown in FIG. 11, the compaction rollers 8 are provided also between the horizontal heating part 6a and the vertical heating part 6b in the embodiment shown in FIG. 10 (thus, the combination of the embodiments shown in FIGS. 9 and 10). This embodiment further improves the 40 surface smoothness and the uniformity of the thickness of the prepreg.

Figure 12:
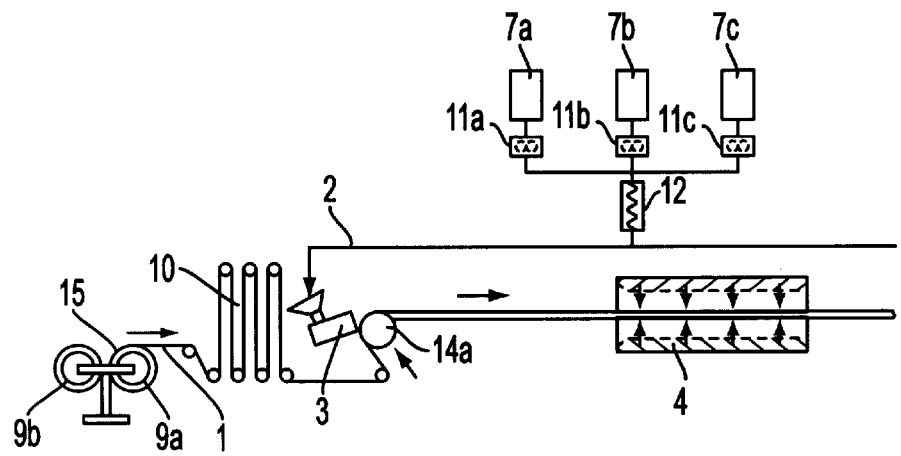
FIG. 12 schematically shows an alternative embodiment of an unwinding unit of a reinforcing substrate in the apparatus of FIG. 1.

FIG. 12 schematically shows an alternative embodiment of the feed-out unit 15 in the embodiment shown in FIG. 1. The embodiment shown in FIG. 12 comprises a stand-by roller 9b in addition to the unwind roller 9a. After the glass cloth is fed out from the roller 9a and then passed through the accumulator 10, the matrix resin 2 is applied to the glass cloth by the first die coater 3. The accumulator 10 is provided in order that the continuous feed of the glass cloth is carried out even when the unwind roller 9a is replaced with the stand-by roller 9b.

Figure 13:
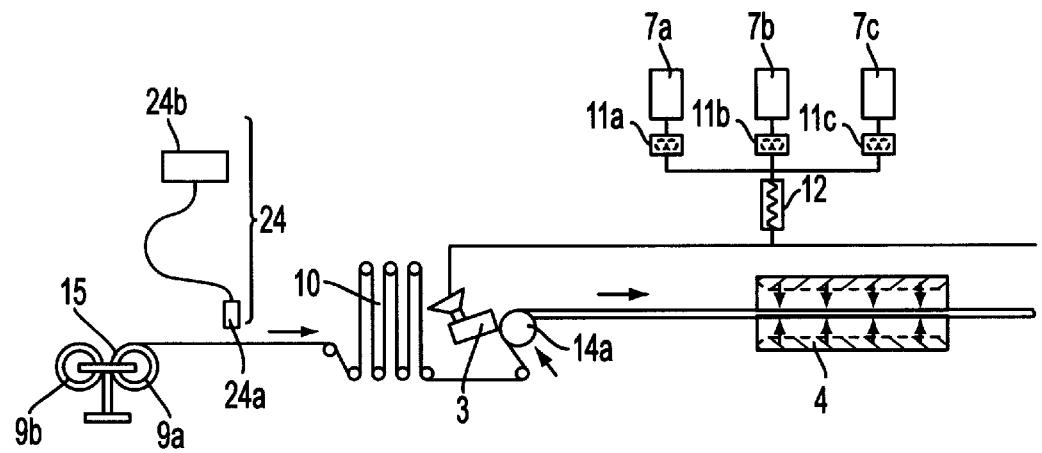
FIG. 13 schematically shows an alternative embodiment of a first coating stop in the apparatus of FIG. 1.

FIG. 13 schematically shows an alternative embodiment of the first coating step in the embodiment shown in FIG. 12. In the embodiment shown in FIG. 13, there is provided a displacement meter 24 which detects a thickness change of the glass cloth before it is fed to the first die coater 3. The meter 24 is positioned above the glass cloth between the unwind roller 9a and the accumulator 10. The meter 24 comprises a sensor 24a which detects the thickness (or thickness change) of the glass cloth and an amplifier 24b which amplifies a signal produced by the sensor 24a. When an end portion of the glass cloth is overlapped with and attached to a beginning portion of another glass cloth, and thus connected glass cloth is continuously fed, the meter 24 detects the double thickness portion of the glass cloth before such a portion is supplied to the first die coater 3 and adjusts so as to enlarge a clearance between the first die coater 3 and the back-up roller 14a by the increase of the thickness, whereby the overlapping portion may smoothly pass through the clearance without being caught. Thus, breakage of the glass cloth due to being caught may be prevented. It is noted that the displacement meter 24 may be positioned below, or above and below the glass cloth. Any other sensor may be used other than the displacement meter as described above provided that it can detect the change of the thickness of the glass cloth.

Figure 14A:
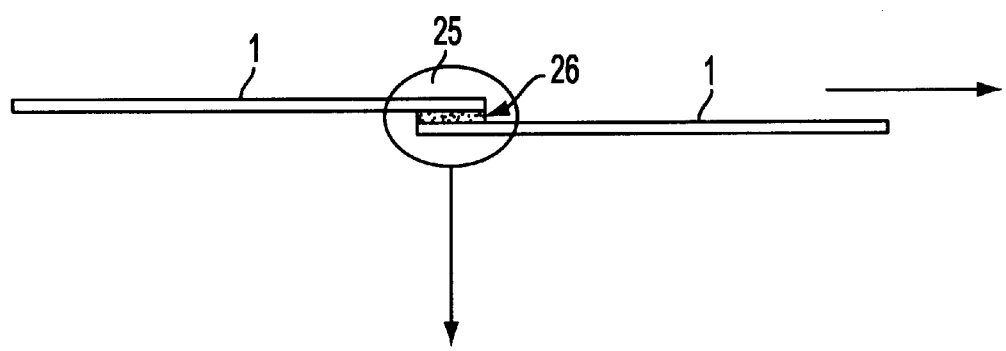
FIG. 14 shows results of laser displacement measurement in which FIG. 14(a) schematically shows a overlapping portion of reinforcing substrates and FIG. 14(b) shows results of the measurement.
Figure 14B:
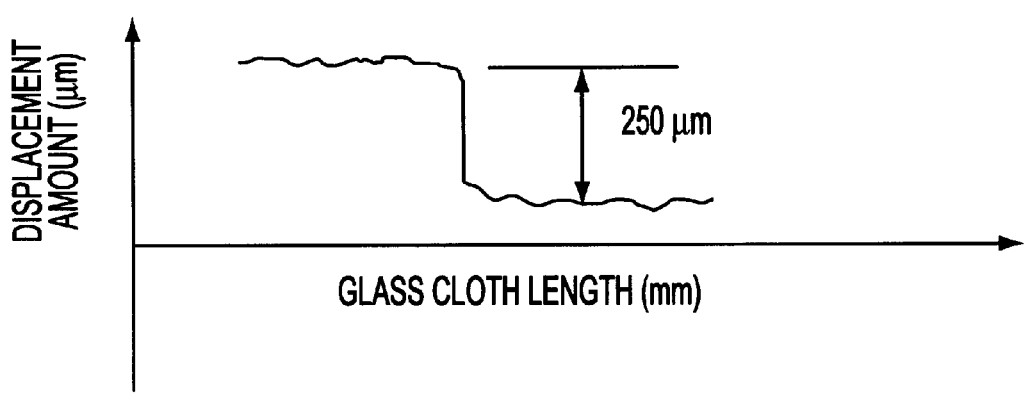

FIG. 14 shows results of the displacement measurement of the overlapping portion 25 formed by connecting an end portion and a beginning of the glass cloths each having a thickness of 180 μm and a woven mesh of 210 g/m² using a double sided adhesive tape 26. A non-contact type visible light laser displacement meter 24 was positioned above the transverse center of the overlapping portion 25 between the unwind roller 9a and the accumulator 10, and the measurement was carried out while the portion 25 was passed below the sensor 24. FIG. 14(a) schematically shows a cross-sectional view of the portion 25, and FIG. 14(b) shows the displacement measurement of the glass cloth in which the vertical axis denotes an amount of displacement of the glass cloth and the horizontal axis denotes the measurement position (or length) of the glass cloth which corresponds to time upon the production of the prepreg.

As seen from FIG. 14, the displacement of about 250 μm occurs in the overlapping portion 25. When the displacement amount more than the thickness of the glass cloth occurs, the sensor sends a signal indicating that the overlapping portion 25 will be passed, and then the signal opens a valve of an air cylinder (not shown) which can move the first die forward or backward so that the coater 3 is moved backward. Practically, the clearance between the first die coater 3 and the back-up roller 14a may be increased to about 100 mm. As a result, the overlapping portion having a thickness of 430 μm can pass through the clearance without being caught.

In place of or in addition to the displacement meter, a CCD camera may be used in order to detect the overlapping portion. When the CCD camera is used, a black tape piece of an appropriate size is attached to the overlapping portion so that the CCD camera can take a picture of the portion having the black piece. The picture is continuously subjected to the two valued processing (i.e. binary picture) using a personal computer and the black piece and the overlapping portion 25 is identified.

The first coating step experiments (Examples 1 to 5 and Comparative Examples 1 and 2) were carried out under various conditions in the production of the prepreg using the apparatus shown in FIG. 1, and the result thereof are shown Table 1 below:

the continuously supplied glass cloth attaches to the back-up roller 14a due to the attached resin so that the glass cloth may be broken. Thus, when the matrix resin is applied to such a glass cloth, the temperatures of the first die coater 3 and the back-up roller 14a are kept lower so that the viscosity of the matrix resin is increased, whereby attainment of the matrix resin up to the back-up roller 14a is prevented. In the experiments as described above, deposition or non-deposition of the matrix resin 2 on the back-up roller 14a was checked. Comparative Example 1 used the same glass cloth as in Example 4, and Comparative Example 2 used the same glass cloth as in Example 5.

As seen from Table 1, no deposition of the matrix resin onto the "back-up" roller 14a was observed in Examples 1 to 5, but the deposition of the matrix resin 2 onto the back-up roller 14a was observed in Comparative Examples 1 and 2. It has been found that when the gas permeability of the glass

TABLE 1

| Sample | Example 1 | Example 2 | Example 3 | Example 4 | Example 5 | Comp. Exam 1 | Comp. Exam 2 |
|---|---|---|---|---|---|---|---|
| thickness (mm) | 0.18 | 0.1 | 0.1 | 0.06 | 0.06 | 0.06 | 0.06 |
| woven mesh (g/m$^2$) | 210 | 103.5 | 103.5 | 48 | 48 | 48 | 48 |
| woven density | | | | | | | |
| warp (ends/25 mm) | 43.5 | 60 | 60 | 60 | 60 | 60 | 60 |
| weft (ends/25 mm) | 32.5 | 58 | 58 | 47 | 47 | 47 | 47 |
| used yarn | | | | | | | |
| warp | 9 μm × 400 fibers | 7 μm × 200 fibers | 7 μm × 200 fibers | 5 μm × 200 fibers | 5 μm × 200 fibers | 5 μm × 200 fibers | 5 μm × 200 fibers |
| weft | 9 μm × 400 fibers | 7 μm × 200 fibers | 7 μm × 200 fibers | 5 μm × 200 fibers | 5 μm × 200 fibers | 5 μm × 200 fibers | 5 μm × 200 fibers |
| gas permeability (cc/cm$^2$/sec) | 6 | 15 | 50 | 70 | 250 | 70 | 250 |
| die coater temp. | 60° C. | 60° C. | 60° C. | 55° C. | 50° C. | 60° C. | 60° C. |
| back-up roller temp. | 10° C. | 10° C. | 10° C. | 5° C. | 5° C. | 10° C. | 10° C. |
| resin deposition on back-up roller | no | no | no | no | no | yes | yes |

The used matrix resin was the same as that described above with reference to FIG. 1. The condition combination was changed such that the temperatures of the first die coater 3 and the back-up roller 14a were adjusted depending on the gas permeability of the glass cloth which was affected by the thickness, the woven density and the woven mesh of the glass cloth. When a glass cloth which has a large gas permeability is used, the matrix resin easily passes through the glass cloth and deposits on the back-up roller 14a, and cloth is larger, the deposition of the matrix resin onto the back-up roller may be avoided by lowering the temperatures of the first die coater 3 and the back-up roller 14a so as to increase the viscosity of the matrix resin.

The first heating step experiments (Examples 6 to 10 and Comparative Examples 3 to 10) were carried out under various conditions in the production of the prepreg using the apparatus shown in FIG. 1, and the results thereof are shown Table 2 below:

TABLE 2

| Sample | Example 6 | Example 7 | Example 8 | Example 9 | Example 10 | Comp. Exam 3 | Comp. Exam 4 |
|---|---|---|---|---|---|---|---|
| thickness (mm) | 0.18 | 0.1 | 0.1 | 0.06 | 0.06 | 0.18 | 0.1 |
| woven mesh (g/m$^2$) | 210 | 103.5 | 103.5 | 48 | 48 | 210 | 103.5 |
| woven density | | | | | | | |
| warp (ends/25 mm) | 43.5 | 60 | 60 | 60 | 60 | 43.5 | 60 |
| weft (ends/25 mm) | 32.5 | 58 | 58 | 47 | 47 | 32.5 | 58 |
| used yarn | | | | | | | |
| warp | 9 μm × 400 fibers | 7 μm × 200 fibers | 7 μm × 200 fibers | 5 μm × 200 fibers | 5 μm × 200 fibers | 9 μm × 400 fibers | 7 μm × 200 fibers |
| weft | 9 μm × 400 fibers | 7 μm × 200 fibers | 7 μm × 200 fibers | 5 μm × 200 fibers | 5 μm × 200 fibers | 9 μm × 400 fibers | 7 μm × 200 fibers |
| gas permeability (cc/cm$^2$/sec) | 6 | 15 | 50 | 70 | 250 | 6 | 15 |
| heater temp. | 350° C. | 300° C. | 300° C. | 250° C. | 150° C. | 150° C. | 350° C. |

TABLE 2-continued

| | | | | | | |
|---|---|---|---|---|---|---|
| atmosphere temp. | 160° C. | 160° C. | 140° C. | 100° C. | 80° C. | 80° C. | 160° C. |
| presence of resin coating on bottom side | good (no coating on bottom side) | good (no coating on bottom side) | good (no coating on bottom side) | good (no coating on bottom side) | good (no coating on bottom side) | excessive resin coating on top side | relatively excessive resin on bottom side |

| Sample | Comp. Exam 5 | Comp. Exam 6 | Comp. Exam 7 | Comp. Exam 8 | Comp. Exam 9 | Comp. Exam 10 |
|---|---|---|---|---|---|---|
| thickness (mm) | 0.1 | 0.1 | 0.1 | 0.06 | 0.06 | 0.06 |
| woven mesh (g/m$^2$) | 103.5 | 103.5 | 103= | 48 | 48 | 48 |
| woven density | | | | | | |
| warp (ends/25 mm) | 60 | 60 | 60 | 60 | 60 | 60 |
| weft (ends/25 mm) | 58 | 58 | 58 | 47 | 47 | 47 |
| used yarn | | | | | | |
| warp | 7 μm × 200 fibers | 5 μm × 200 fibers | 5 μm × 200 fibers | 5 μm × 200 fibers | 5 μm × 200 fibers | 5 μm × 200 fibers |
| weft | 7 μm × 200 fibers | 5 μm × 200 fibers | 5 μm × 200 fibers | 5 μm × 200 fibers | 5 μm × 200 fibers | 5 μm × 200 fibers |
| gas permeability (cc/cm$^2$/sec) | 15 | 50 | 50 | 70 | 70 | 250 |
| heater temp. | 150° C. | 350° C. | 150° C. | 350° C. | 150° C. | 350° C. |
| atmosphere temp. | 80° C. | 160° C. | 80° C. | 160° C. | 80° C. | 160° C. |
| presence of resin coating on bottom side | excessive resin coating on top side | excessive resin coating on bottom side | excessive resin coating on top side | excessive resin on bottom side | relatively excessive resin on top side | excessive resin on bottom side |

As the heating unit 4, a far infrared heater was used. The matrix resin used was the same as that used in the above Examples. The condition combination was changed such that the temperature of the first heating unit 4 is adjusted depending on the gas permeability of the glass cloth which is affected by the thickness, the woven density and the woven mesh of the glass cloth as described above. When a glass cloth which has a larger gas permeability is used, the matrix resin easily passes through the glass cloth so that a bottom side of the reinforcing substrate is likely to include a coating of the matrix resin having a larger thickness thereon. When a glass cloth which has a smaller gas permeability is used, the matrix resin does not easily pass through the glass cloth so that a top side portion of the reinforcing substrate is likely to include a coating of the matrix resin having a larger thickness thereon. Thus, when the matrix resin is applied to the such a glass cloth, the temperature of the first heating unit 4 (and thus a temperature of the heating atmosphere in the heating unit 4) is kept lower or higher so that the viscosity of the matrix resin 2 is increased or reduced, whereby an amount of the matrix resin which reaches the bottom side portion or remains in the top side portion of the substrate is controlled to be the same as that of other side portion of the substrate, whereby the reinforcing substrate contains the coatings of the matrix resin having the uniform thicknesses on its both sides. In the experiments as described above, an amount of the matrix resin 2 which reached the bottom side portion of the substrate was visually checked.

Comparative Example 3 corresponds to Example 6, Comparative Examples 4 and 5 correspond to Examples 7, Comparative Examples 6 and 7 correspond to Example 8, Comparative Examples 8 and 9 correspond to Example 9, and Comparative Examples 10 corresponds to Example 10. As seen from Table 2, appropriate inclusion of the matrix resin by the reinforcing substrate was achieved in Examples 6 to 10 by appropriately reducing or increasing the temperature of the first heating unit 4 when the gas permeability of the glass cloth was larger or smaller. To the contrary, when the temperature of the first heating unit 4 was excessively high in Comparative Examples 4, 6, 8 and 10, the viscosity of the matrix resin was too low so that the amount of the matrix resin 2 which reached the bottom side portion of the substrate was excessive, which resulted in the presence of the resin coating on the bottom side of the substrate. Further, when the temperature of the first heating unit 4 is excessively low in Comparative Examples 3, 5, 7 and 9, the viscosity of the matrix resin was too high so that the amount of the matrix resin 2 which remained in the top side portion of the substrate was excessive, which resulted in the presence of the resin coating on the top side of the substrate. The terms "bottom side portion" and "top side portion" are intended to mean, throughout the specification, a lower half portion and an upper half portion of the reinforcing substrate, and there is no clear border between these portions. Practically, the impregnation state which can be observed from the bottom side of the substrate is the impregnation state of the bottom side portion, and vice versa.

Figure 15:
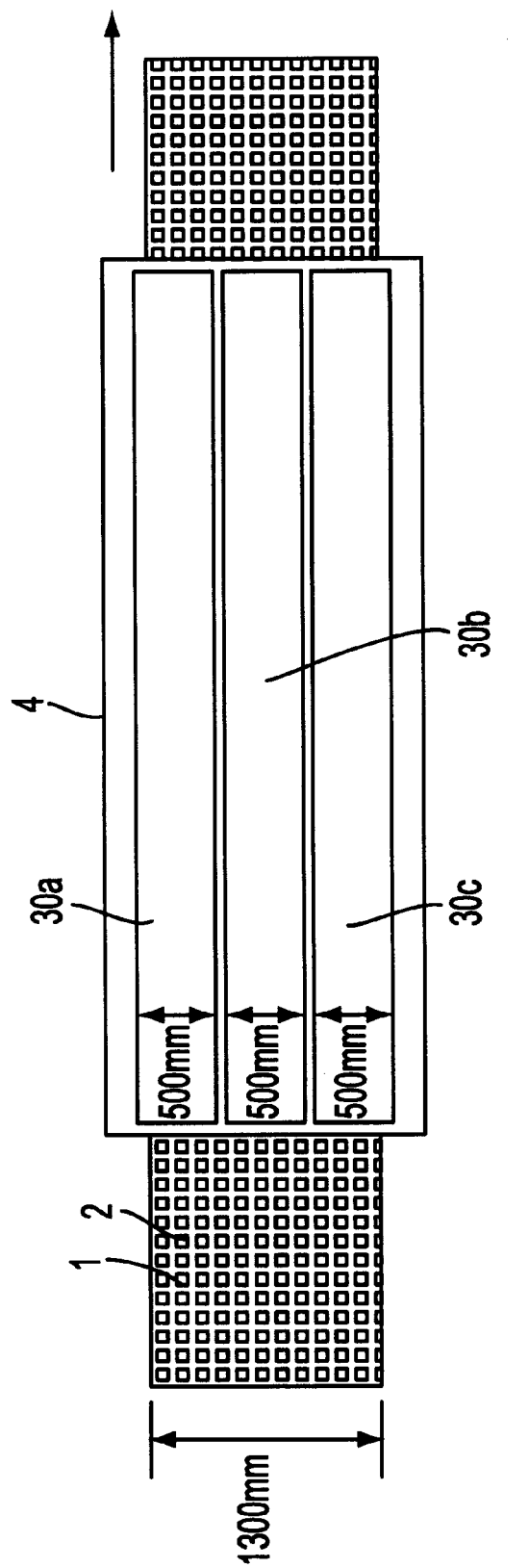
FIG. 15 schematically shows a first heating unit of a fifth embodiment of an apparatus for producing a prepreg according to a process of the present invention.

FIG. 15 schematically shows the first heating step of a fifth embodiment of the apparatus which carries out the present process for producing the prepreg.

The first heating unit 4 is divided into three longitudinal parts (heating zones 30a, 30b and 30c) along a moving direction of the glass cloth so that the glass cloth can be heated differently in three longitudinal portions thereof. Thus, a set temperature of each heating zone can be selected depending on the gas permeability of a portion of the glass cloth. Since the set temperature of the heating zone may be set lower which heats a portion of the glass cloth having a higher gas permeability, and vice versa, any bottom side portion of the glass cloth includes substantially the same amount of the matrix resin, and thus the thickness of the coating of the matrix resin on the top side of the reinforcing substrate is substantially the same as that of on the bottom side.

The following may be an example of the divisional heating of the first heating step: A glass cloth having a width of 1300 mm, a thickness of 180 μm and a woven mesh of 210 g/m$^2$ is used; A mixture as a matrix resin comprises a composition (A) containing a bisphenol type epoxy resin as a main component and small amounts of a phenol compound and a polyfunctional epoxy resin, an epoxy resin composition (B) containing a dicyandiamide (DICY) hardener, and an epoxy resin composition (C) containing an imidazole based hardening promoter; Such a matrix resin has a viscosity of 6000 cPs; An amount of the matrix resin applied by the first die coater 3 is 90% of the matrix resin which is totally applied in the production process, and such an amount corresponds to a resin content of 137 g/m² which is the minimum amount of the matrix resin plus an amount of the resin which coats only the first coating side of the reinforcing substrate. Each of the heating zones 30a, 30b and 30c has a width of 500 mm.

Using the fifth embodiment including the heating unit 4 shown in FIG. 15 as described above, experiments (Examples 11 to 15) were carried out, and the results are shown in Table 3 below:

they would finally remain in the prepreg. Thus, the impregnation state of the matrix resin is monitored using the CCD camera 32 between the first heating step and the second coating step, and when the void positions 31 are present in the laminar composite, the heating temperature of the first heating unit 4 is increased so as to reduce the viscosity of the matrix resin 2, whereby the matrix resin can be sufficiently impregnated into the glass cloth without leaving void portions. Further, when a picture with which more precise determination is possible is to be obtained, two valued

TABLE 3

| Sample | Example 11 | Example 12 | Example 13 | Example 14 | Example 15 |
|---|---|---|---|---|---|
| thickness (mm) | 0.18 | 0.1 | 0.1 | 0.06 | 0.06 |
| woven mesh (g/m²) | 210 | 103.5 | 103.5 | 48 | 48 |
| woven density | | | | | |
| warp (ends/25 mm) | 43.5 | 60 | 60 | 60 | 60 |
| weft (ends/25 mm) | 32.5 | 58 | 58 | 47 | 47 |
| used yarn | | | | | |
| warp | 9 μm × 400 fibers | 7 μm × 200 fibers | 7 μm × 200 fibers | 5 μm × 200 fibers | 5 μm × 200 fibers |
| weft | 9 μm × 400 fibers | 7 μm × 200 fibers | 7 μm × 200 fibers | 5 μm × 200 fibers | 5 μm × 200 fibers |
| gas permeability (cc/cm²/sec) | | | | | |
| left portion | 9 | 20 | 65 | 90 | 300 |
| middle portion | 6 | 15 | 50 | 70 | 250 |
| right portion | 6 | 15 | 50 | 70 | 250 |
| heater temp. of zone 30a | 330° C. | 280° C. | 250° C. | 200° C. | 100° C. |
| heater temp. of zone 30b | 350° C. | 300° C. | 300° C. | 250° C. | 150° C. |
| heater temp. of zone 30c | 350° C. | 300° C. | 300° C. | 250° C. | 150° C. |
| atmosphere temp. | 160° C. | 160° C. | 140° C. | 100° C. | 80° C. |
| resin impregnation on bottom side | transversely uniform | transversely uniform | transversely uniform | transversely uniform | transversely uniform |

In the above Examples, five kinds of the glass cloth were prepared each of which had three portions one of which has a different gas permeability from those of the other two portions. The first heating step was carried out with selecting various heating temperatures of the zones 30a, 30b and 30c, and the impregnation of the matrix resin 2 at the bottom side portion of the substrate was visually checked. In any of Examples 11 to 15, the gas permeability of the glass cloth portion facing the heating zone 30a was high, and thus the heating temperature of the heating zone 30a was set lower, so that transversely uniform impregnation of the matrix resin was achieved.

Figure 16:
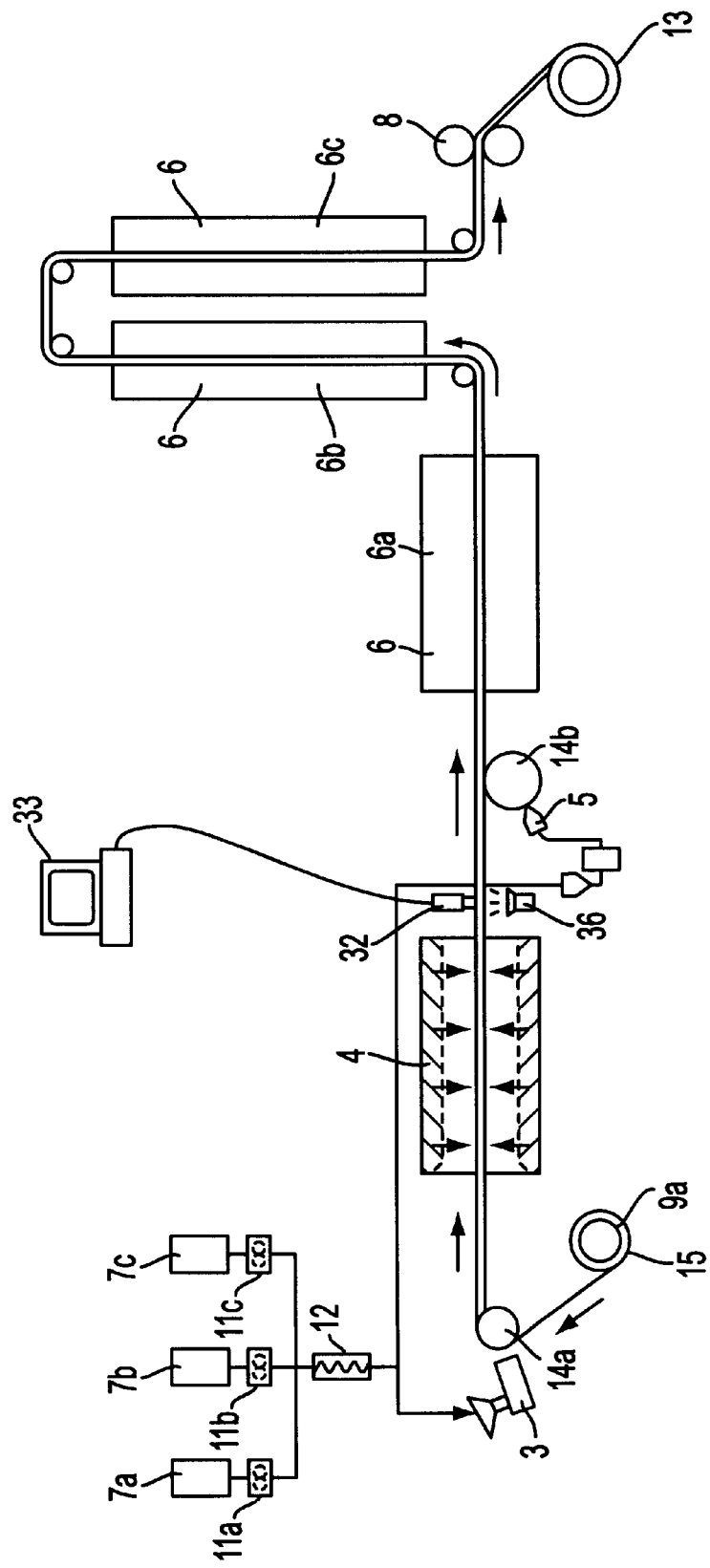
FIG. 16 schematically shows a first heating step and a second coating step of a sixth embodiment of an apparatus for producing a prepreg according to a process of the present invention.

FIG. 16 schematically shows the first heating step and the second coating step of a sixth embodiment of the apparatus which carries out the present process for producing the prepreg.

Figure 17:
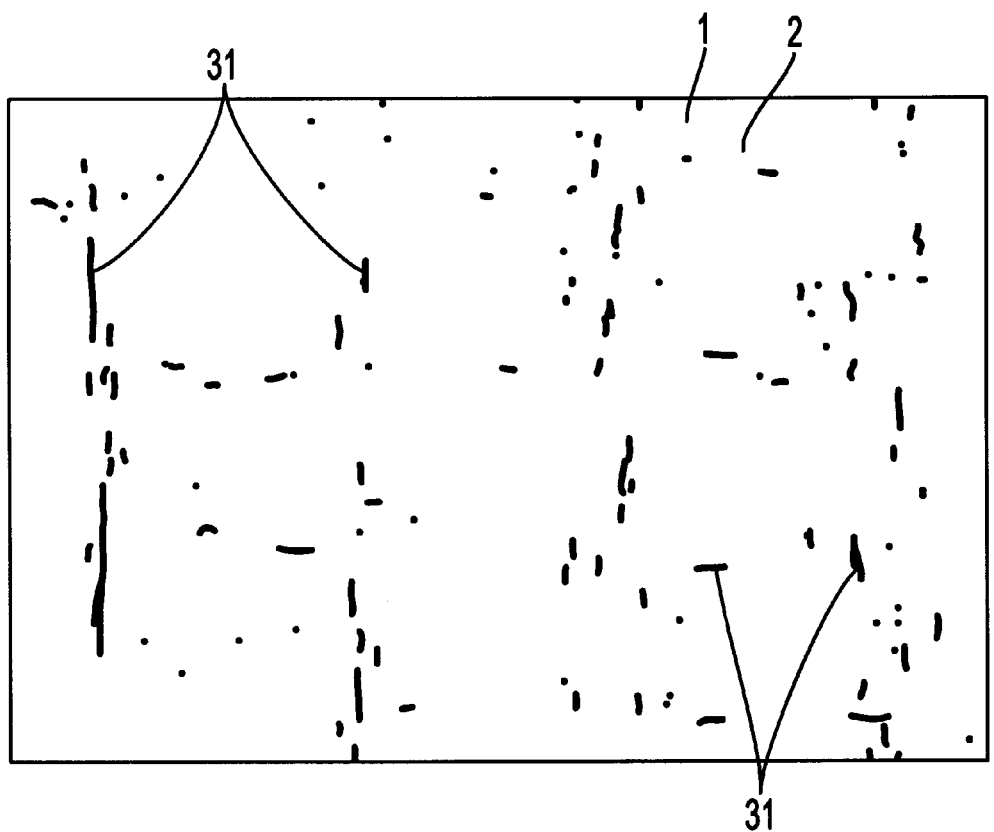
FIG. 17 is a drawing schematically shows a CCD camera picture of a surface state of a laminar composite comprising a glass cloth after a first heating step.

FIG. 17 schematically shows an enlarged CCD camera picture of a glass cloth surface having void portions 31 after the first heating step. The picture was obtained using the CCD camera 32 which is positioned above the transversely center portion of the glass cloth (thus, the laminar composite) which has left the first heating step 4. The heating step was carried out as in the embodiment as described with reference to FIG. 15. A back lighting 36 was positioned across the glass cloth. The impregnation state of the matrix resin into the glass cloth was observed with a monitor 33 connected to the CCD camera. Light of the back lighting does not pass the void portions 31 so that those portions look dark in the picture while the sufficiently impregnated portions look bright since the light passes through those portions.

As seen from FIG. 17, the glass cloth has void portions 31. If those portions are still present after the first heating step, processing of the picture may be carried out using an image processing and analyzing unit. In addition, when a plurality of the CCD cameras are positioned transversely, difference of the impregnation along a width direction of the glass cloth may be detected, and if necessary, the first heating unit may be divided into the longitudinal portions so that each longitudinal portion of the glass cloth may be heated separately.

Figure 18:
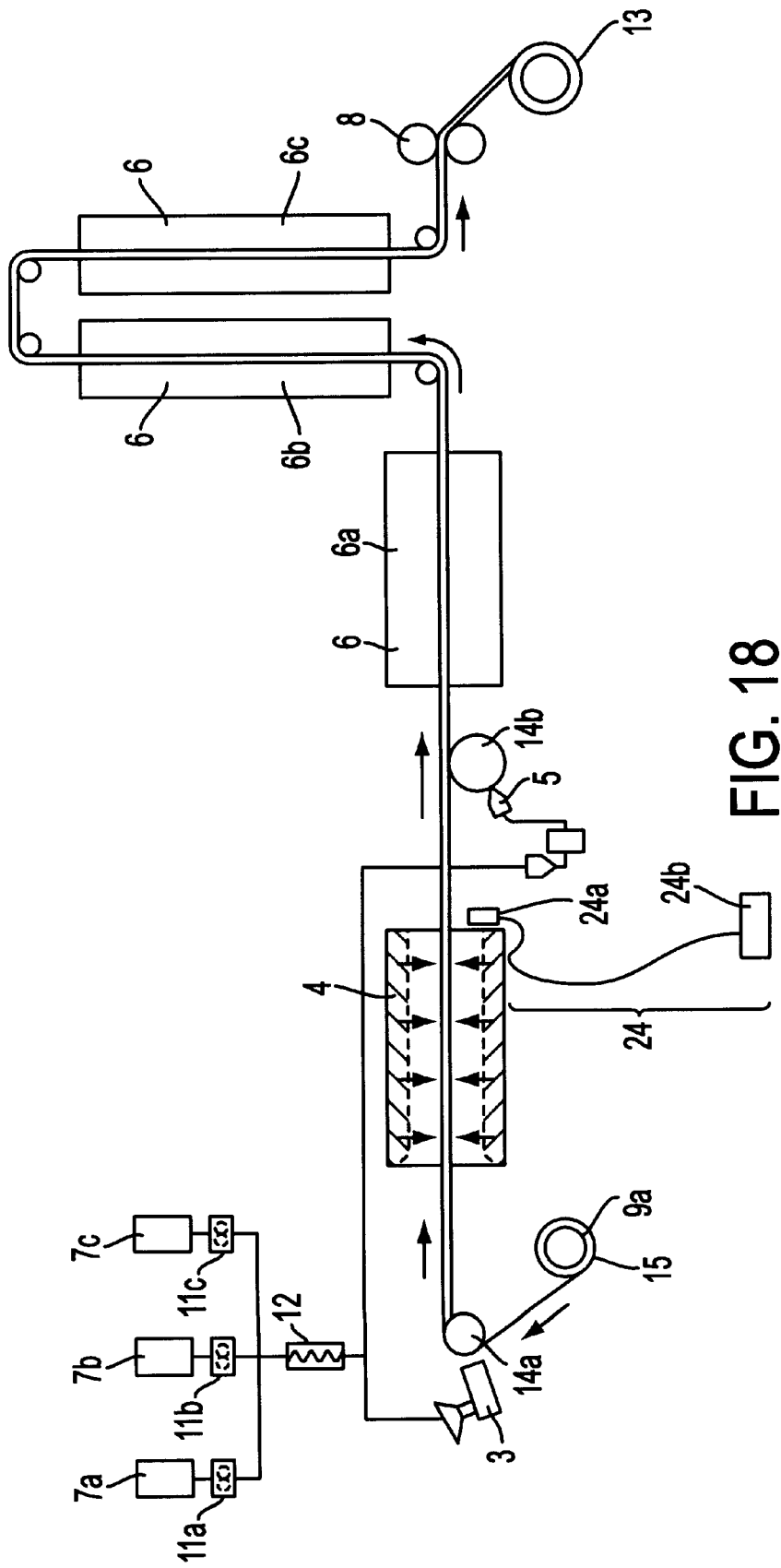
FIG. 18 schematically shows a first heating unit step and a second coating step of a seventh embodiment of an apparatus for producing a prepreg according to a process of the present invention.

FIG. 18 schematically shows the first heating step and the second coating step of a seventh embodiment of the apparatus which carries out the present process for producing the prepreg.

In the embodiment shown in FIG. 18, a displacement meter 24 is positioned between the first heating step and the second coating step so that an amount of the matrix resin 2 which reaches the bottom side of the reinforcing substrate through voids formed by the warps and the wefts is detected. When the amount is excessively large, the heating temperature of the first heating unit 4 is reduced so as to increase the viscosity of the matrix resin 2, and vice versa. Thus, the amount of the reaching resin can be unified, and the impregnation states of the top and the bottom side of the glass cloth are substantially the same (namely, one side has the same coating thickness as that of the other).

Figure 19A:
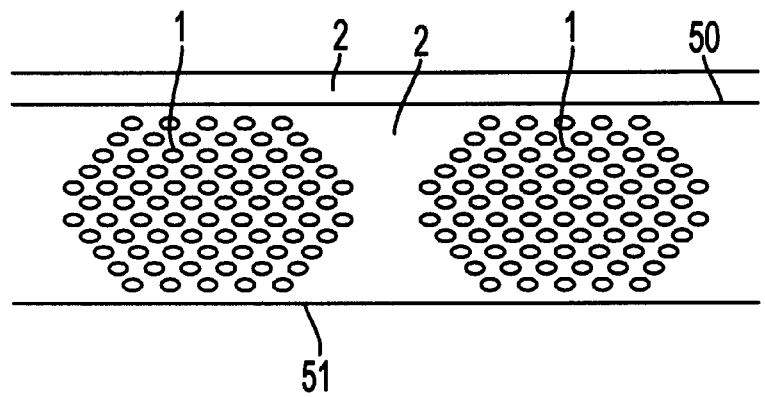
FIG. 19 shows results of surface displacement measurement of a glass cloth wherein FIG. 19(a) schematically shows a cross-sectional view of the glass cloth.
FIG. 19(b) shows a graph of displacement measurements of the top side and the bottom side of the glass cloth.
Figure 19B:
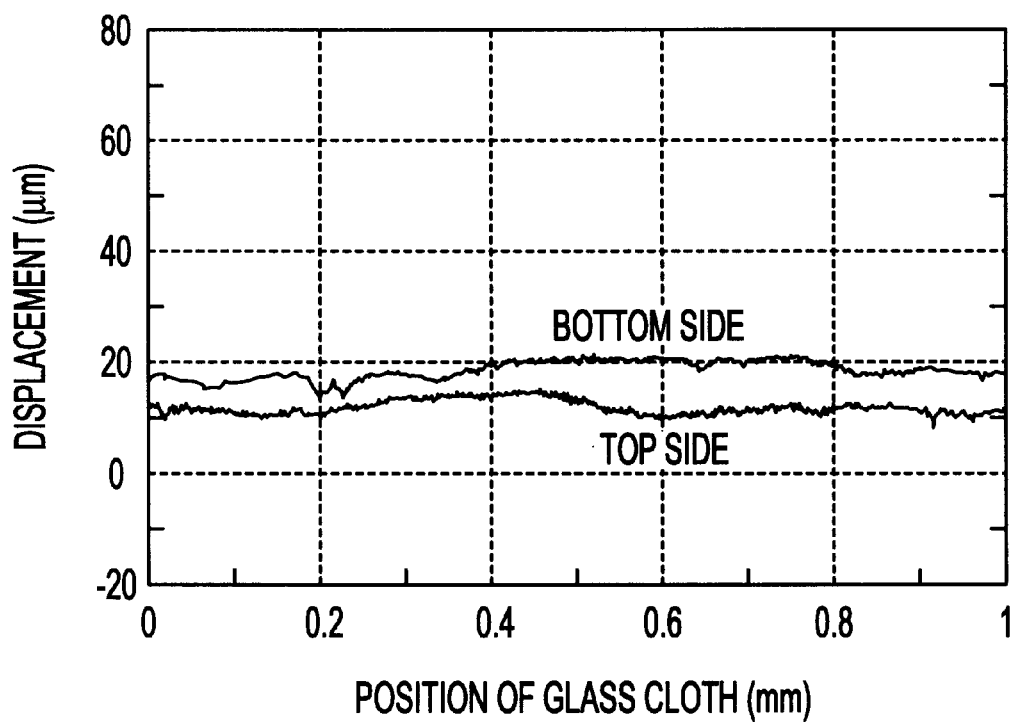
Figure 20A:
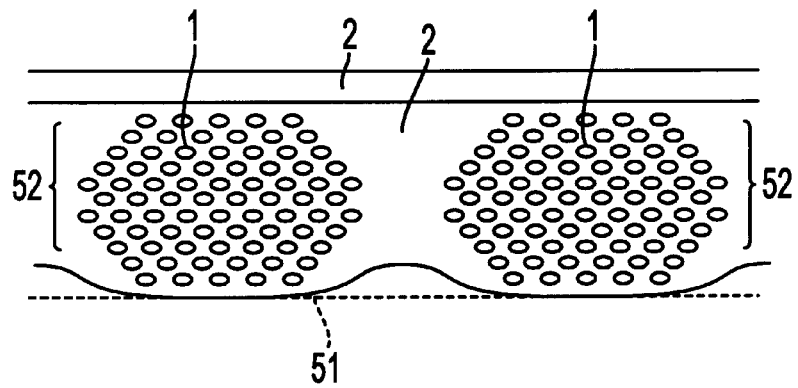
FIG. 20 shows results of surface displacement measurement of a glass cloth which is to be compared with FIG. 19, wherein FIG. 20(a) schematically shows a cross-sectional view of the glass cloth.
FIG. 20(b) shows a graph of displacement measurements of the top side and the bottom side of the glass cloth.
Figure 20B:
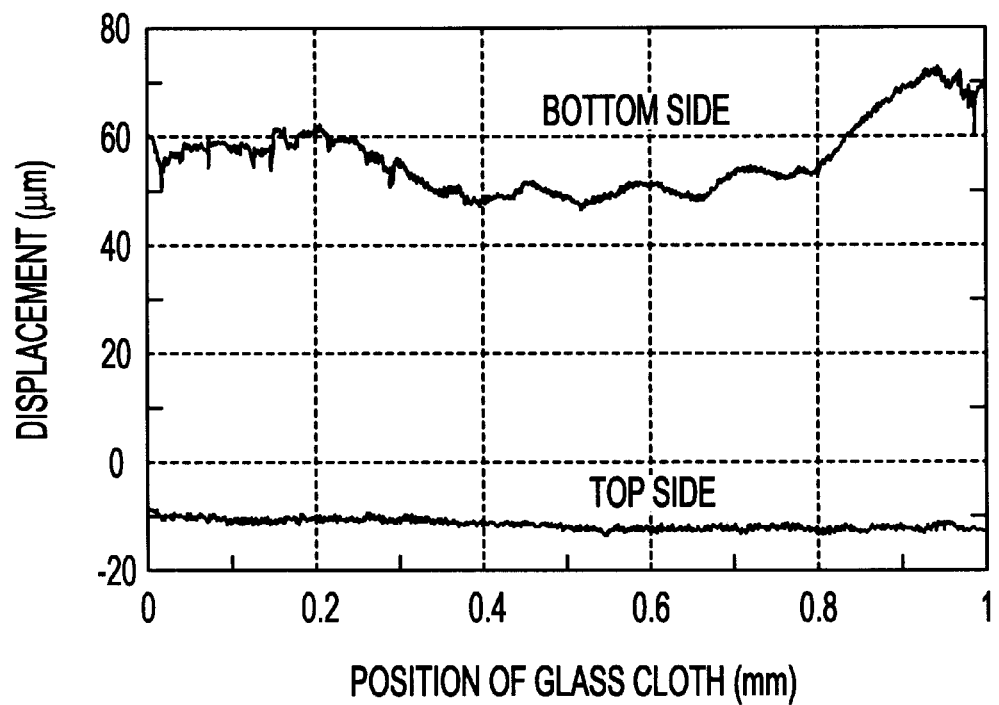

FIGS. 19 and 20 show results of displacement measurement of the top and the bottom surfaces of the glass cloth 1 including the matrix resin 2 when the first coating step was carried out using the apparatus shown in FIG. 18. The same glass cloth, matrix resin as described with reference to FIG. 15 were used under the same conditions as those also as described with reference to FIG. 15. The displacement measurement was carried out using the visible light laser displacement meter positioned in the transverse center of the glass cloth between the first heating step and the second coating step. In FIGS. 19 and 20, schematic cross-sectional views of the substrate including the matrix resin (i.e. the laminar composite) are shown in FIGS. (a), and the surface (the top surface and the bottom surface of the laminar composite) displacement measurements are shown in FIGS. (b). The heating temperature of the atmosphere of the first heating unit 4 was 160° C. (cf. a set temperature of the heating unit was 350° C.) in FIG. 19 and 80° C. (cf. a set temperature of the heating unit was 150° C.) in FIG. 20.

In FIG. 19, since the matrix resin 2 has reached the bottom side (bottom surface) 51 of the reinforcing substrate 1, the surface displacement pattern of the bottom side 51 is not substantially changed irrespective of the position of the glass cloth. To the contrary, in FIG. 20, the matrix resin 2 has not reached to the bottom side 51 of the reinforcing substrate 1 between the bundles 52 of the fibers. Thus, the surface displacement pattern of the bottom side shows a wave like undulation corresponding to the presence of the bundles of the fibers, and further small sharp changes of the displacement are also observed corresponding to the presence of the exposed fibers or yarns (not shown in FIG. 20(a) because of the schematic drawing, but there are in fact exposed fibers or yarns). When a plurality of the visible light laser displacement meters are disposed side by side transversely with respect to the glass cloth, displacement dispersion of the bottom sides of the glass cloth may be recognized so that the impregnation difference can be detected along the width direction of the glass cloth. Depending on the difference, the heating temperature of the first heating unit may be changed potion by portion transversely by dividing the heating unit into the longitudinal parts as described above so as to change the viscosity of the matrix resin potion by portion transversely, whereby the impregnation state of the resin may be unified.

Figure 21:
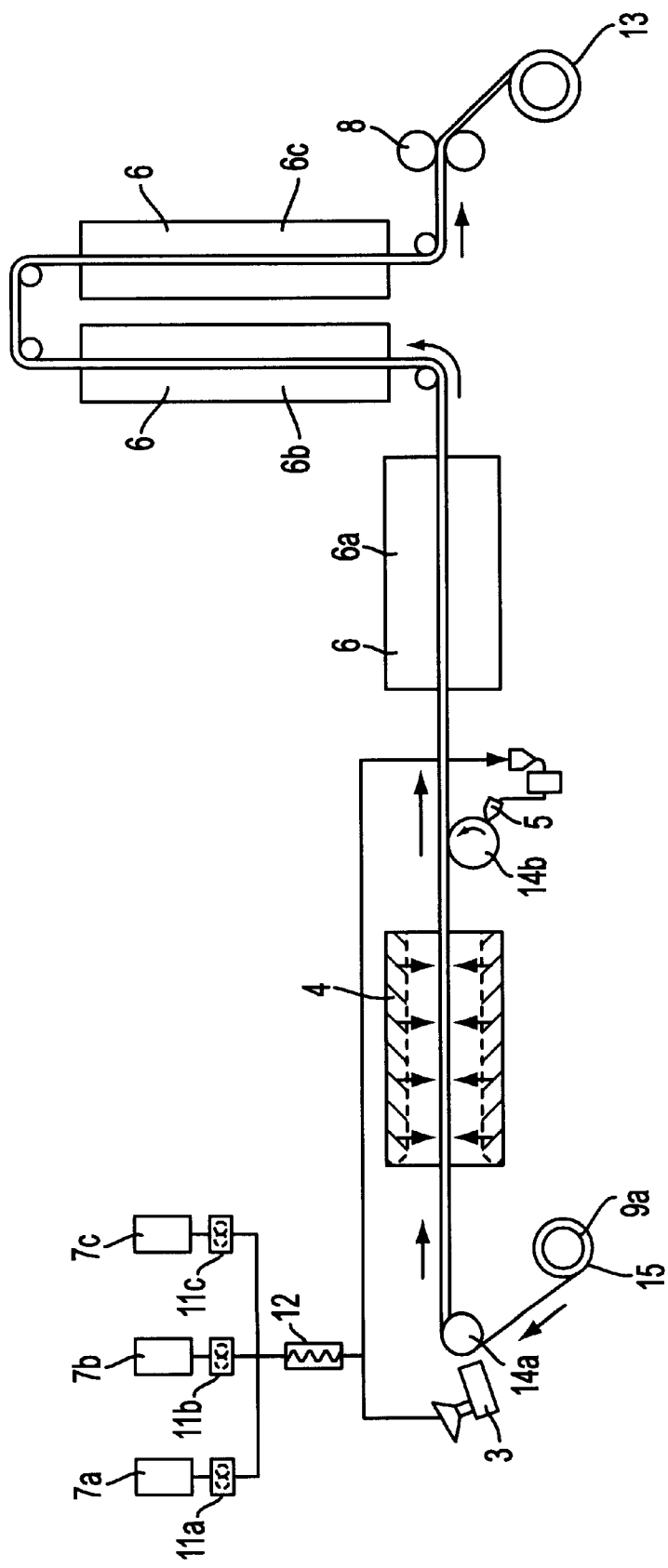
FIG. 21 schematically shows a second coating step of an eighth embodiment of an apparatus for producing a prepreg according to a process of the present invention.
Figure 22B:
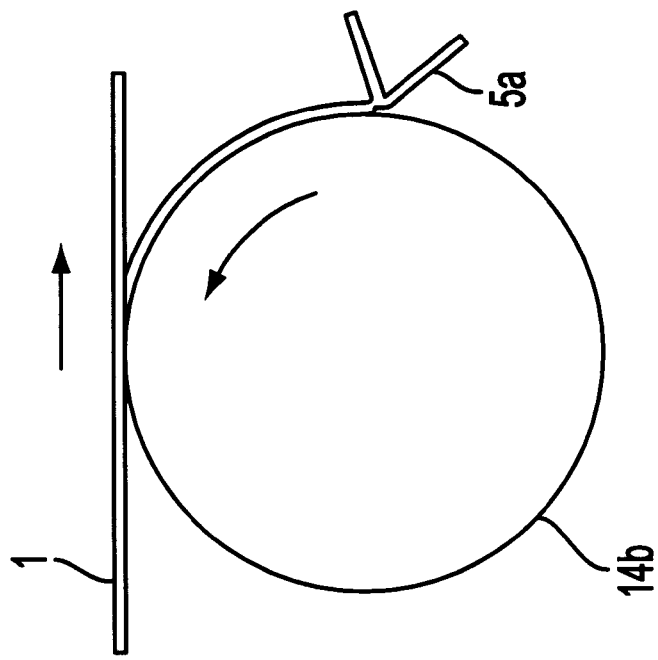
FIG. 22(b) shows that the back-up roller rotates backward as indicating with an arrow in the example of the present invention.
Figure 22A:
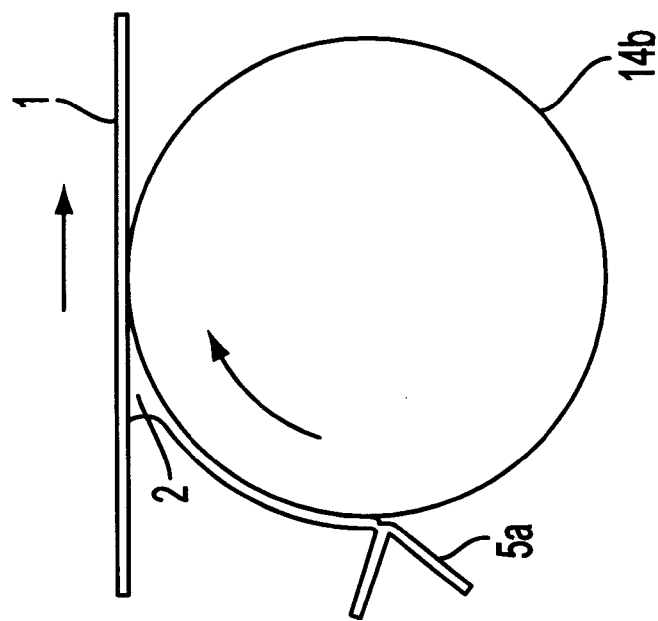
FIG. 22(a) shows that the back-up roller rotates forward as indicating with an arrow in a comparative example.

FIG. 21 schematically shows the second coating step of an eighth embodiment of the apparatus which carries out the present process for producing the prepreg. FIG. 22 shows an enlarged back-up roller 14b used in the apparatus shown in FIG. 21. FIG. 22(a) shows the back-up roller 14b which rotates along a direction of the movement of the reinforcing substrate 1 (i.e. the forward rotation), and FIG. 22(b) shows the back-up roller 14b which rotates along a direction opposite to a direction of the movement of the reinforcing substrate 1 (i.e. the backward rotation), which is preferable. When the back-up roller 14b supporting the substrate 1 as shown in FIG. 22(b) rotates in reverse to the substrate 1, substantially no matrix resin 2 accumulates between the reinforcing substrate 1 and the back-up roller 14b so that an amount to be applied to the substrate 1 can be kept constant.

For example, the same glass cloth 1 and matrix resin 2 as those described with reference to FIG. 15 were used in the apparatus shown in FIGS. 21 and 22 under the same conditions of the first coating step and the first heating step as those described with reference to FIG. 15. After the first heating step, 10% of the matrix resin 2 (viscosity 6000 cPs) which was to be totally applied (i.e. the total resin content) was applied to the bottom side of the glass cloth 1 using the second die coater 5. Such an amount of the matrix resin corresponded to a resin content of 15 g/m². When the back-up roller 14b rotated reversely (as shown in FIG. 22(b)) at a circumferential speed of 8 m/min., and the substrate moving speed was 8 m/min., a substantially uniform thickness of the resin coating having improved smoothness was obtained. To the contrary, when the back-up roller 14b which rotated forward at a circumferential speed of 8 m/min. (as shown in FIG. 22(a)), an amount of the matrix resin accumulated between the substrate 1 and the back-up roller 14b, and finally when the amount achieved a certain limit, all of the accumulating resin was transferred to the glass cloth.

Further, when the circumferential speed of the back-up roller 14b rotating backward was increased so that it was larger than the moving speed of the glass cloth, the matrix resin 2 was transferred to the glass cloth more smoothly, whereby the smooth resin coating was formed. When the speed of the back-up roller 14b was increased to 12 m/min. and to 16 m/min., a much more smooth coating was obtained. To the contrary, when the circumferential speed was reduced to 4 m/min, the coating had relatively less smoothness.

Figure 23:
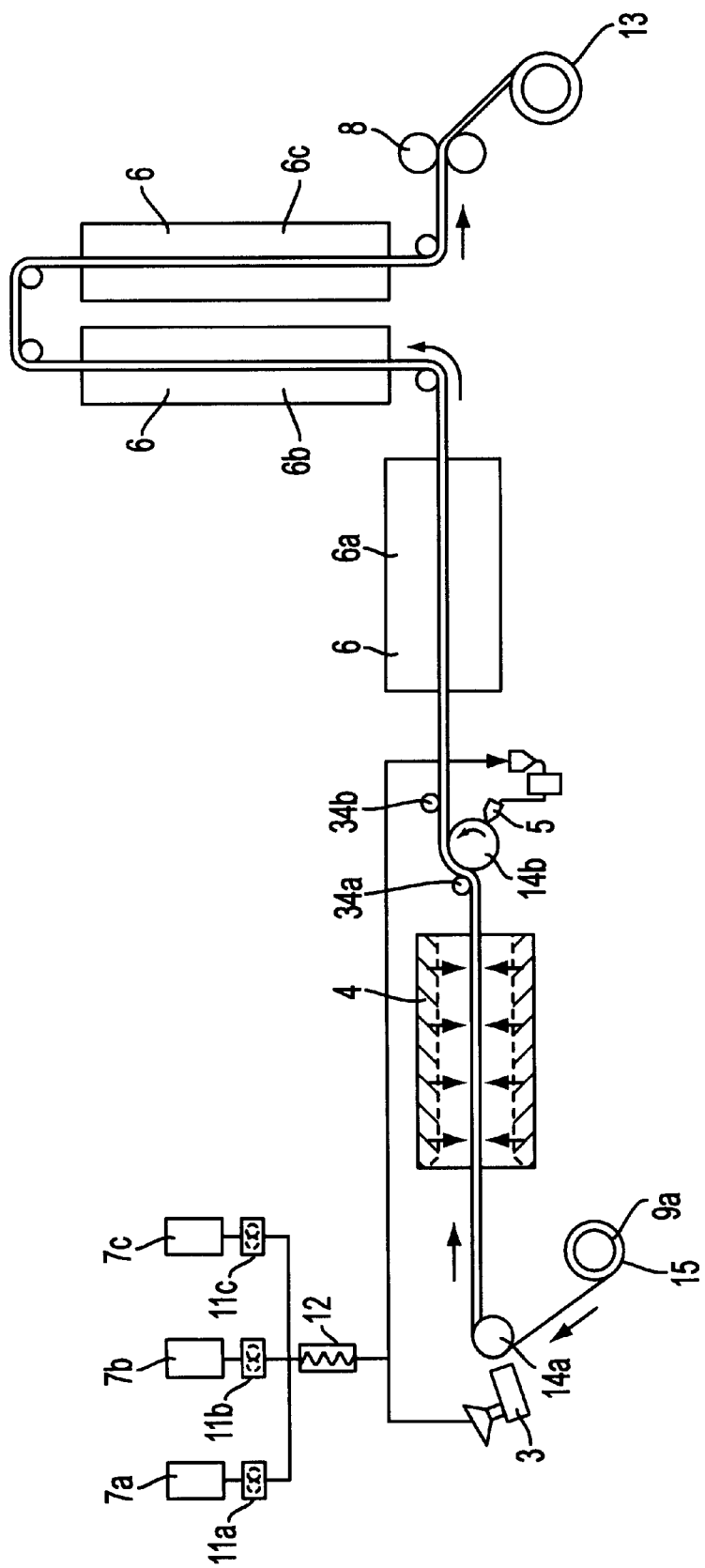
FIG. 23 schematically shows a second coating step of a ninth embodiment of an apparatus for producing a prepreg according to a process of the present invention.

FIG. 23 schematically shows the second coating step of a ninth embodiment of the apparatus which carries out the present process for producing the prepreg, wherein the glass cloth is pressed by the press rollers 34a and 34b between which the back-up roller 14b is placed. Alternatively, one of the press rollers 34a and 34b may be used instead of using the both. In this embodiment, a contact area between the glass cloth 1 and the back-up roller 14b is kept substantially constant, which results in the effective production of the uniform and smooth matrix resin coating.

For example the same glass cloth 1 and matrix resin 2 which are the same as those as described with reference to FIG. 15 were used in the apparatus shown in FIG. 23 under the same conditions of the first, coating step and the first heating step as those described with reference to FIG. 15. After the first heating step, 10% of the matrix resin (viscosity 6000 cPs) which was to be totally applied was applied to the bottom side of the glass cloth using the second die coater 5 and the reversely rotating back-up roller 14b. Such an amount of the matrix resin corresponded to a resin content of 15 g/m². The upstream press roller 24a and optionally the downstream press roller 34b were lowered so as to keep the contact area constant between the glass cloth 1 and the back-up roller 14b. Further, the contact area may be increased or decreased by moving the rollers 34a and/or 34b along the longitudinal direction of the glass cloth, whereby an optimum contact area may be selected.

Figure 24:
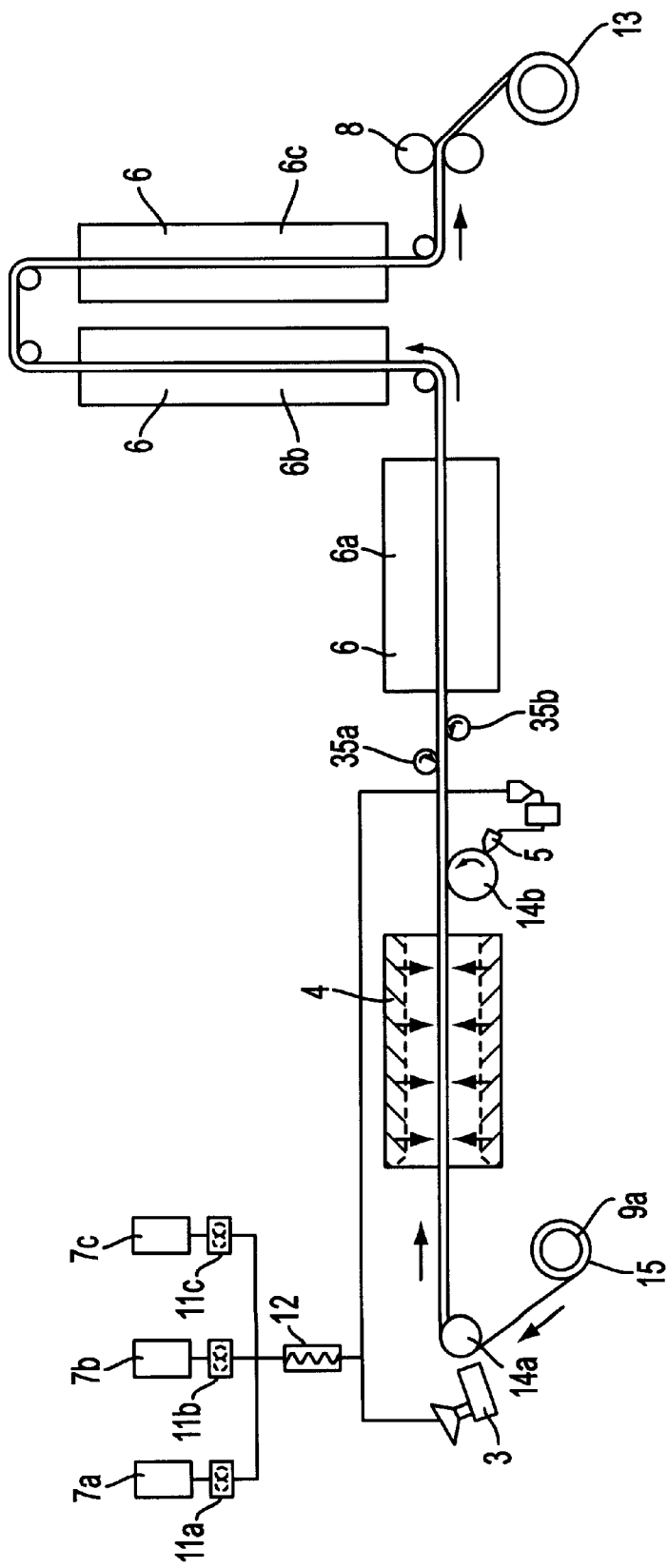
FIG. 24 schematically shows a second coating step and the second heating step of a tenth embodiment of an apparatus for producing a prepreg according to a process of the present invention.

FIG. 24 schematically shows the second coating step of a tenth embodiment of the apparatus which carries out the present process for producing the prepreg, wherein smoothing rollers 35a and 35b which rotate reversely to the direction of the glass cloth moving so as to smooth the resin coating on both sides of the glass cloth. Optionally, a single smoothing roller may be used.

For example, the same glass cloth 1 and matrix resin 2 which are the same as those as described with reference to FIG. 15 were used in the apparatus shown in FIG. 24 under the same conditions of the first coating step and the first heating step as those described with reference to FIG. 15 After the first heating step, 10% of the matrix resin (viscosity 6000 cPs) which was to be totally applied was applied to the bottom side of the glass cloth using the second die coater 5 and the reversely rotating back-up roller 14b. Such an amount of the matrix resin corresponded to a resin content of 15 g/m². The smoothing rollers 35a and 35b (which rotated backward) were disposed one on the top side and the other on the bottom side of the glass cloth where the matrix resin was in a fluidic state between the second coating step and the second heating step. The moving speed of the glass cloth was 8 m/min. and the circumferential speed of each of the smoothing rollers 35a and 35b was also 8 m/min. A heating medium at a temperature of 60° C. was recirculated through the smoothing rollers 35a and 35b. The coating smoothness of the top side and the bottom side of the glass cloth was highly improved by using the smoothing rollers 35a and 35b.

Figure 25:
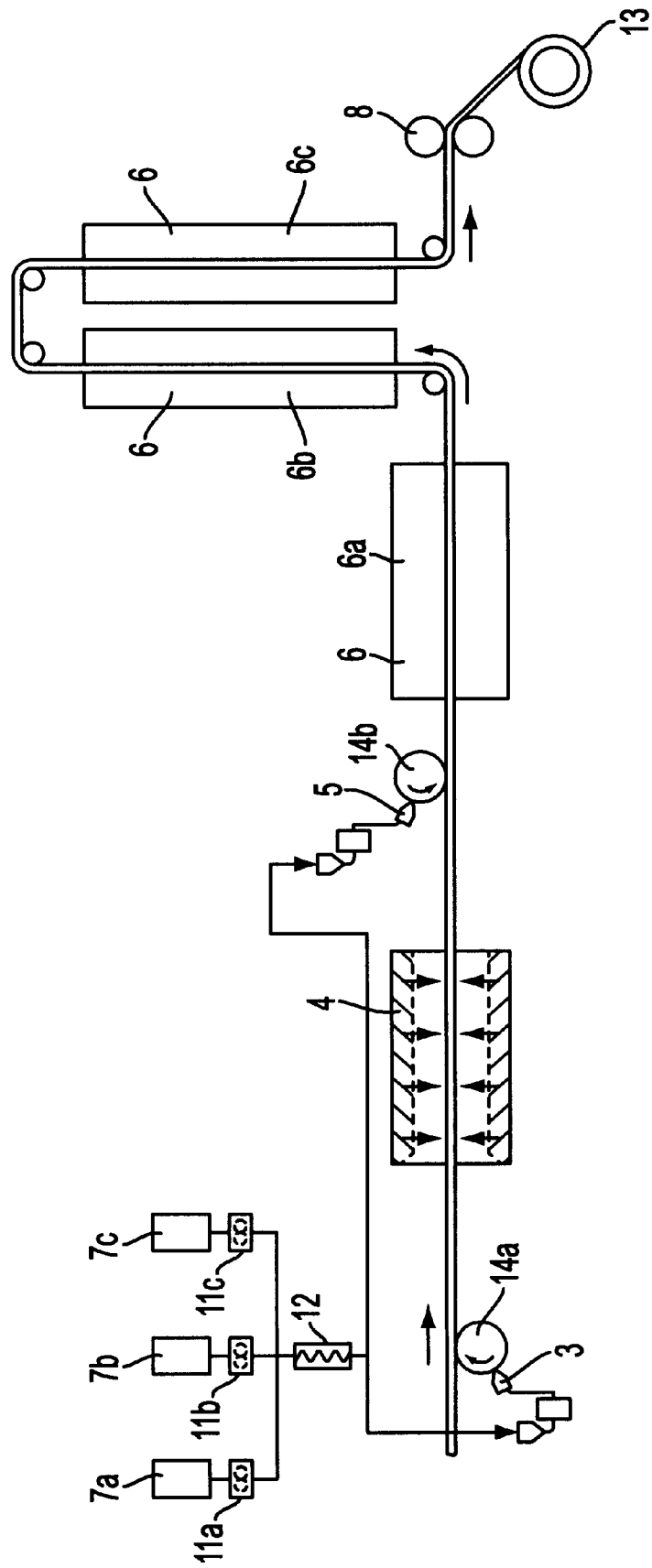
FIG. 25 schematically shows a first coating step, a first heating step, a second coating step and the second heating step of an eleventh embodiment of an apparatus for producing a prepreg according to a process of the present invention.
Figure 27:
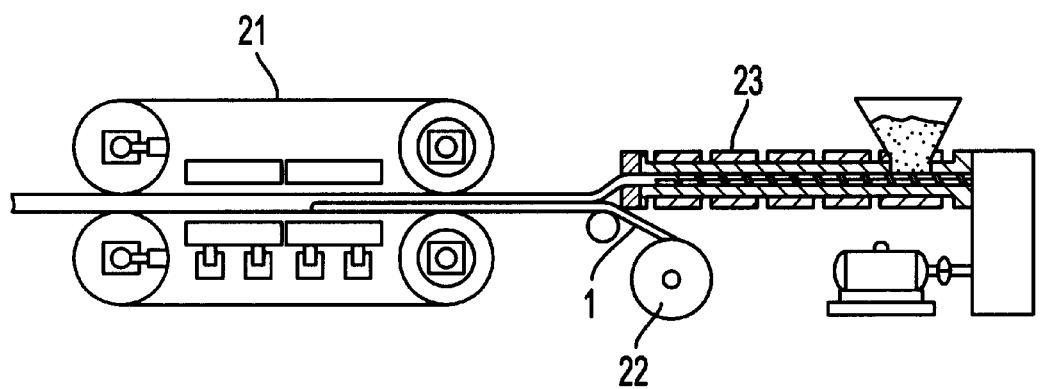
FIG. 27 schematically shows an apparatus of the prior art for producing a prepreg.

FIG. 25 schematically shows the first coating step, the first heating step, the second coating step and the second heating step of an eleventh embodiment of the apparatus which carries out the present process for producing the prepreg, and FIG. 26 schematically shows states of the glass cloth 1 and the matrix resin 2 during the process wherein FIG. 26(*a*) shows a state just after the first coating step, FIG. 26(*b*) shows a state after the first heating step, and FIG. 26(*c*) shows a state after the second coating step.

As seen from FIGS. 25 and 26, the first coating step applies the matrix resin to the glass cloth in an amount of at least the minimum amount (in fact, the minimum amount plus an amount required for the formation of the coating on the bottom side 51 of the glass cloth 1) from the bottom side 51 of the glass cloth 1. The second coating step applies the matrix resin from the top side 50 of the glass cloth. Since the first coating step is carried out from the bottom side, an excessive amount of the matrix resin is prevented from reaching the top side 50 of the glass cloth. 1 by means of the gravity force effect, whereby the amounts of the resin included in the bottom side portion and the top side portion are substantially uniform.

For example, the same glass cloth 1 and matrix resin 2 which are the same as those as described with reference to FIG. 15 were used in the apparatus shown in FIG. 25 under the same conditions of the first coating step as those described with reference to FIG. 15 except that the first coating step was carried out so as to apply the resin to the bottom side of the glass cloth. After the first heating step in which the glass cloth having a coating on its bottom side was heated for 30 seconds by the far infrared heater so that the matrix resin penetrated into the inside and up to the top side of the glass cloth, 10% of the matrix resin (viscosity 6000 cPs) which was to be totally applied was applied to the top side of the glass cloth using the second die coater 5. Such an amount of the matrix resin corresponded to a resin content of 15 g/m$^2$. In the second heating step, the heating unit 6 was divided longitudinally portions, of which heating temperatures were controlled separately such that the heating temperature of the divided portion of the heating unit 6 was lowered when a portion of the resin matrix heated by such a divided portion was excessively hardened, whereby the prepreg had the uniform hardening degree as a whole.

In any embodiment as described above in which the compaction rollers 8 are used, when the reinforcing substrate having the matrix resin is compressed, it is preferable to cool the substrate by means of for example a spot cooler so that deposition of the matrix resin onto the compaction rollers can be avoided.

We claim:

1. A process of producing a prepreg in which a sheet-shaped fabric material as a reinforcing substrate is continuously provided, a thermosetting resin as a matrix resin in a molten state is supplied to the substrate, and the resin is heated, which process comprises the steps of:

(a) a first coating step in which the matrix resin is applied to one surface of the reinforcing substrate using a first die coater, and an amount of the matrix resin to be applied is equal to or larger than an amount of the matrix resin which the reinforcing substrate is able to contain in its total void as much as possible, (b) a first heating step in which the reinforcing substrate having the matrix resin is heated by a first non-contact type heating unit so that the matrix resin is impregnated into the inside of the reinforcing substrate, whereby a laminar composite made of the matrix resin and, the reinforcing substrate is obtained, (c) a second coating step in which the matrix resin is further applied to at least one of surfaces of the laminar composite using a second die coater, and (d) a second heating step in which the laminar composite which has an amount of the matrix resin applied in the step (c) is heated by a second non-contact type heating unit so as to semi-harden the matrix resin.

2. The process of producing a prepreg according to the claim 1, wherein the matrix resin comprises components of:

(A) an epoxy resin composition as a main component, (B) a resin composition comprising at least a hardener, and (C) a hardening promoter, each component being kept in a fluidic state, all the component are mixed together uniformly, and supplied to the first and/or the second die coaters.

3. The process of producing a prepreg according to the claim 2, wherein each component of the matrix resin or a mixture of the mixed components is filtered between its storage tank and a mixer where all the components are mixed together or between the mixer and the die coaters while each component of the matrix resin or the mixture has a viscosity in the range between 500 and 500000 centipoise.

4. The process of producing a prepreg according to the claim 1, wherein the amount of the matrix resin to be applied in the first coating step includes, in addition to the amount of the matrix resin which the reinforcing substrate is able to contain in its total void as much as possible, an amount which is necessary to form a coating on the surface of the reinforcing substrate to which surface the matrix resin is applied, and the second coating step applies the matrix resin to a surface of the reinforcing substrate which surface is opposite to the surface to which the matrix resin is applied in the first coating step.

5. The process of producing a prepreg according to the claim 1, wherein the second coating step applies the matrix resin to both sides of the laminar composite in such an amount that a coating of the matrix resin is formed on each surface of the laminar composite.

6. The process of producing a prepreg according to the claim 1, wherein additional heating is carried out at an inlet or/and an outlet of the first heating unit of the first heating step.

7. The process of producing a prepreg according to the claim 1, wherein the second heating step is carried out such that a heating temperature is increased toward an outlet of the second heating unit.

8. The process of producing a prepreg according to the claim 1, wherein the process further comprises the step in which the reinforcing substrate having the matrix resin is pressed while being heated using compaction rollers during or after the second heating step.

9. The process of producing a prepreg according to the claim 1, wherein the process further comprises the step in which a thickness of the reinforcing substrate is detected before the reinforcing substrate is supplied to the first die coater so that a clearance between the first die coater and a back-up roller is adjusted depending on the detected thickness of the reinforcing substrate.

10. The process of producing a prepreg according to the claim 1, wherein temperatures of the die coater and a back-up roller of the first coating step are adjusted depending on gas permeability of the reinforcing substrate.

11. The process of producing a prepreg according to the claim 1, wherein the heating temperature of the first heating step is adjusted to depending on gas permeability of the reinforcing substrate.

12. The process of producing a prepreg according to the claim 1, wherein the first heating step heats each of a plurality of longitudinal portions of the reinforcing substrate separately.

13. The process of producing a prepreg according to the claim 1, wherein an impregnation state of the matrix resin into the inside of the reinforcing substrate is detected between the first heating step and the second coating step, and the heating temperature of the first heating step is adjusted so as to reduce the voids in the laminar composite, if any.

14. The process of producing a prepreg according to the claim 1, wherein a state of the matrix resin is detected which reaches a side of the reinforcing substrate which is opposite to the first coating side between the first heating step and the second coating step, and the heating temperature of the first heating step is adjusted so as to unify the state of the matrix resin.

15. The process of producing a prepreg according to the claim 1, wherein the reinforcing substrate is supported by a back-up roller which rotates reversely to the moving direction of the reinforcing substrate in the second coating step.

16. The process of producing a prepreg according to the claim 15, wherein the back-up roller rotates at a circumferential speed larger than that of a moving speed of the reinforcing substrate in the second coating step.

17. The process of producing a prepreg according to the claim 15, wherein the reinforcing substrate is forced down by a pressing roller before or after the back-up roller, or pressing rollers before and after the back-up roller in the second coating step.

18. The process of producing a prepreg according to the claim 1, wherein one surface or both surfaces of the reinforcing substrate having the matrix resin is smoothed by a smoothing roller or rollers which rotates reversely to a direction to a moving direction of the reinforcing substrate between the second coating step and the second heating step.

19. The process of producing a prepreg according to the claim 1, wherein the matrix resin is applied to a bottom side of the reinforcing substrate in the first coating step, and the matrix resin is applied to a top side of the reinforcing substrate in the second coating step.

20. The process of producing a prepreg according to the claim 1, wherein the second heating step heats each of a plurality of longitudinal portions of the reinforcing substrate including the matrix resin separately.

21. The process of producing a prepreg according to the claim 1, wherein the first heating unit comprises a vertical heating unit in which the reinforcing substrate is moved vertically.

22. An apparatus for producing a prepreg which comprises an unwinding unit of a reinforcing substrate, an accumulator unit which works upon exchange of a reinforcing substrate feed roller so as to continue a process for producing the prepreg, storage tanks which keep a main composition (A), a hardener composition (B), and a hardening promoter composition (C) at a predetermined temperature in their fluidic states respectively, metering devices which dispense the compositions from the tanks respectively, a mixing unit which mixes the metered compositions together to prepare a matrix resin, a first die coater which applies the matrix resin to the reinforcing substrate, a first non-contact type heating unit which impregnates the reinforcing substrate with the matrix resin to form a laminar composite, a first detector which detects an impregnation state of the matrix resin into the reinforcing substrate, a second detector which detects matrix resin which reaches a side of the reinforcing substrate which is opposite a first coating side, a second die coater which applies the matrix resin to the laminar composite, a second heating unit which semi-hardens the matrix resin included in the laminar composite, a compaction roller unit which presses and smooths the reinforcing substrate impregnated with the matrix resin and which also keeps the reinforcing substrate at a predetermined temperature, and a wind-up roller which winds up the produced prepreg or a cutting unit which cut the produced prepreg transversely.

23. The apparatus of claim 22, structured and arranged for controlling the first heating unit in response to the first detector unit.

24. The apparatus of claim 22, structured and arranged for controlling the first heating unit in response to the second detector unit.

* * * * *

UNITED STATES PATENT AND TRADEMARK OFFICE
CERTIFICATE OF CORRECTION

PATENT NO. : 6,060,124
DATED : May 9, 2000
INVENTOR(S) : N. Ikegawa et al.

It is certified that error appears in the above-identified patent and that said Letters Patent is hereby corrected as shown below:

<u>Column 26,</u>
Line 1 (claim 1, line 16) of the printed patent, after "and" delete ", ".

Signed and Sealed this

Ninth Day of October, 2001

Attest:

*Nicholas P. Godici*

NICHOLAS P. GODICI
*Attesting Officer*     *Acting Director of the United States Patent and Trademark Office*